United States Patent
Tanaka et al.

(10) Patent No.: US 11,392,463 B2
(45) Date of Patent: Jul. 19, 2022

(54) EFFECTIVE BACKUP OF DATA USED BY MULTIPLE NODES EXECUTING PARALLEL PROCESSING

(71) Applicant: FUJITSU LIMITED, Kawasaki (JP)

(72) Inventors: Mutsuhiro Tanaka, Mishima (JP); Tadao Amada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 16/657,060

(22) Filed: Oct. 18, 2019

(65) Prior Publication Data

US 2020/0125461 A1    Apr. 23, 2020

(30) Foreign Application Priority Data

Oct. 22, 2018    (JP) .............................. JP2018-198773

(51) Int. Cl.

| | |
|---|---|
| *G06F 11/00* | (2006.01) |
| *G06F 11/20* | (2006.01) |
| *G06F 9/48* | (2006.01) |
| *G06F 9/52* | (2006.01) |
| *G06F 11/16* | (2006.01) |

(52) U.S. Cl.
CPC .......... *G06F 11/203* (2013.01); *G06F 9/4856* (2013.01); *G06F 9/522* (2013.01); *G06F 11/1658* (2013.01); *G06F 11/2038* (2013.01); *G06F 11/2048* (2013.01); *G06F 2201/82* (2013.01)

(58) Field of Classification Search
CPC ............... G06F 11/1658; G06F 11/203; G06F 11/2038; G06F 11/2041; G06F 11/2048; G06F 11/2028; G06F 9/4856; G06F 9/522; G06F 11/1456; G06F 11/1469; G06F 11/1464
See application file for complete search history.

(56) References Cited

U.S. PATENT DOCUMENTS

| | | | |
|---|---|---|---|
| 5,737,514 A | 4/1998 | Stiffler | |
| 9,098,439 B2 * | 8/2015 | Chiu | .................... G06F 11/1469 |
| 9,965,364 B2 * | 5/2018 | Markus | ............... G06F 16/2282 |
| 10,503,563 B1 * | 12/2019 | Havemose | .............. G06F 9/455 |

(Continued)

FOREIGN PATENT DOCUMENTS

| | | |
|---|---|---|
| JP | 2000-501216 A | 2/2000 |
| JP | 2006-155473 | 6/2006 |

(Continued)

OTHER PUBLICATIONS

JPOA—Office Action of Japanese Patent Application No. 2018-198773 dated May 10, 2022 with Machine Translation.

*Primary Examiner* — Marc Duncan
(74) *Attorney, Agent, or Firm* — Fujitsu Patent Center

(57) ABSTRACT

When barrier synchronization is executed between multiple nodes that include a node and execute processing for a same job, the node transmits first data indicating an intermediate result of processing of the node to another node with which processing of the node is to be synchronized first among the multiple nodes, and receives second data indicating an intermediate result of processing of the other node from the other node. The node stores the first data of the node in a first memory region of a memory provided for the node, and store the second data of the other node in a second memory region of the memory.

15 Claims, 26 Drawing Sheets

(56) References Cited

U.S. PATENT DOCUMENTS

| | | | |
|---|---|---|---|
| 2007/0233870 A1* | 10/2007 | Goto | G06F 9/5033 |
| | | | 709/226 |
| 2007/0266212 A1 | 11/2007 | Uchikado et al. | |
| 2010/0124241 A1 | 5/2010 | Hiramoto et al. | |
| 2020/0379858 A1* | 12/2020 | Xu | G06F 11/0757 |

FOREIGN PATENT DOCUMENTS

| | | |
|---|---|---|
| JP | 2007-265013 | 10/2007 |
| JP | 2007-286860 | 11/2007 |
| JP | 2010-122848 A | 6/2010 |
| JP | 2011-186606 A | 9/2011 |
| JP | 2017-138780 | 8/2017 |

\* cited by examiner

FIG. 15

| | NODE N0 | | | | | | NODE N1 | | | | | | NODE Np | |
|---|---|---|---|---|---|---|---|---|---|---|---|---|---|---|
| BARRIER POINT 1 | y[0] | a[0][0] | a[0][1] | a[0][2] | a[0][3] | a[0][4] | a[0][5] | ... | a[0][m-1] | a[0][m] | x[0] |
| BARRIER POINT 2 | y[1] | a[1][0] | a[1][1] | a[1][2] | a[1][3] | a[1][4] | a[1][5] | ... | a[1][m-1] | a[1][m] | x[1] |
| BARRIER POINT 3 | y[2] | a[2][0] | a[2][1] | a[2][2] | a[2][3] | a[2][4] | a[2][5] | ... | a[2][m-1] | a[2][m] | x[2] |
| BARRIER POINT 4 | y[3] | a[3][0] | a[3][1] | a[3][2] | a[3][3] | a[3][4] | a[3][5] | ... | a[3][m-1] | a[3][m] | x[3] |
| BARRIER POINT 5 | y[4] | a[4][0] | a[4][1] | a[4][2] | a[4][3] | a[4][4] | a[4][5] | ... | a[4][m-1] | a[4][m] | x[4] |
| BARRIER POINT 6 | y[5] | a[5][0] | a[5][1] | a[5][2] | a[5][3] | a[5][4] | a[5][5] | ... | a[5][m-1] | a[5][m] | x[5] |
| ... | ... | ... | ... | ... | ... | ... | ... | ... | ... | ... | ... |
| BARRIER POINT n | y[n-1] | a[n-1][0] | a[n-1][1] | a[n-1][2] | a[n-1][3] | a[n-1][4] | a[n-1][5] | ... | a[n-1][m-1] | a[n-1][m] | x[m-1] |
| BARRIER POINT n+1 | y[n] | a[n][0] | a[n][1] | a[n][2] | a[n][3] | a[n][4] | a[n][5] | ... | a[n][m-1] | a[n][m] | x[m] |

FIG. 16A

```
/* */
/* PROCESS OF N   (EXAMPLE) */
/* */
#include <stdio.h>
#include <stdlib.h>
#include <math.h>
#include <mpi.h>

/* DEFINITIONS OF FIXED VALUES */
#define M    10000
#define N    768
#define CA   (10000 * sizeof(double))
#define TND  100

/* DEFINITION OF PHYSICAL-TO-LOGICAL NODE CONVERSION */
typedef struct
{
    int spare_physical_nodeid;   /* *PHYSICAL NODE NUMBER OF REDUNDANT NODE */
    int vertial_nodeid ;          /* *FAILED VIRTUAL NODE NUMBER */
} adminservertrap ;

/* *INTERRUPT FUNCTION IS DEFINED. IT IS ASSUMED THAT PROCESS IS EXECUTED IN RESPONSE TO RECEPTION OF TRAP EVEN DURING
   TIME WHEN NODE WAITS FOR BARRIER SYNCHRONIZATION. */
#define int
void ON_error(adminservertrap nodeid);
    ;
```

PROGRAM ~1600

FIG. 16B

```
PROGRAM  1600

/* CONCERNED NODE, NODE FORMING PAIR WITH CONCERNED NODE, LINE VARIABLE BEING PROCESSED *STORE IN (2) TABLE REGION */
static int   myrank, pair, line;
/* VIRTUAL-TO-ACTUAL NODE CONVERSION TABLE *STORE IN (2) TABLE REGION */
static int   nodeid[sizeof(int) * TND * 2];

/* INITIALIZE ARRAY *STORE IN (3) DATA REGION */
static double y[N] = {0.0, 0.0, 0.0, 0.0, 0.0, 0.0, . . . 0.0, 0.0};

/* INITIALIZE ARRAY *STORE IN (4) DATA REGION */
static double A[N][M] = {1.0, 0.0, 0.0, 0.0, 0.0, 0.0, 0.0,      0.0, 0.0,
                         0.0, 1.0, 0.0, 0.0, 0.0, 0.0, 0.0,      0.0, 0.0,
                         0.0, 0.0, 1.0, 0.0, 0.0, 0.0, 0.0,      0.0, 0.0,
                         0.0, 0.0, 0.0, 1.0, 0.0, 0.0, 0.0,      0.0, 0.0,
                         0.0, 0.0, 0.0, 0.0, 1.0, 0.0, 0.0,      0.0, 0.0,
                         . . .                              . . . . . .
                         0.0, 0.0, 0.0, 0.0, 0.0, 0.0, 0.0, . .  1.0, 0.0,
                         0.0, 0.0, 0.0, 0.0, 0.0, 0.0, 0.0, . .  0.0, 1.0};

/* INITIALIZE ARRAY *STORE IN (5) DATA REGION */
static double x[M]   = {0.0, 1.0, 2.0, 3.0, 4.0, 5.0, . . . 9998, 9999};
```

FIG. 16C

```
/* SECURE COMPUTATION REGION, CONCERNED NODE MEMORY REGION, AND OTHER NODE MEMORY REGION */
static double *basearea = (double *)malloc(CA) ;
static double *copyarea_my = (double *)malloc(CA) ;
static double *copyarea_pair = (double *)malloc(CA) ;

/* DEFINE PROTOTYPE OF FUNCTION */
void MatrixVectorMult(double y[N], double A[N][M], int st, int en, int i0);
void PairBarrier(int pair);
void MutualOp(int pair);
void IntermediateOp();
int PhysicalNode();    /* *IT IS ASSUMED THAT FUNCTION IDENTIFYING CONCERNED ACTUAL NODE ID IS DEFINED. ~*/

/* MAIN PROCESS */
int main(int argc, char* argv[]) {
/* DEFINITION OF VARIABLE */
int  i, len, st, len, numproc;

/* TABLE REGIONS FROM (2) TABLE REGION TO (5) TABLE REGION ARE SET TO BE VIEWED FROM *basearea */
basearea = &myrank ;
```

PROGRAM ~1600

FIG. 16D

PROGRAM ~1600

```
/* INITIALIZE MPI */
ierr = MPI_Init(&argc, &argv);
ierr = MPI_Comm_rank(MPI_COMM_WORLD, &myrank);
ierr = MPI_Comm_size(MPI_COMM_WORLD, &numprocs);

/* On error INTERRUPTION ---------------*/
/* *FUNCTION TO BE PROCESSED WHEN ERROR OCCURS. IMAGE OF BACKGROUND PROCESS */
On error;

/* My processing area ---------------*/  /* *CALCULATE COMPUTATION RANGE WITHIN CONCERNED NODE */
ilen = N / numprocs ;
ist = ilen * myrank;
ien = ilen * (myrank + 1);

/* My pair ---------------*/
/* *DETERMINE PAIR OF NODES THAT MUTUALLY HOLD DATA */
if((myrank % 2) == 1){
    pair = myrank - 1 ;
}else{
    pair = myrank + 1 ;
};

/* Main begins ---------------*/
/* *BARRIER SYNCHRONIZATION BEFORE START OF COMPUTATION (START WHEN ALL AFOREMENTIONED PROCESSES ARE
    TERMINATED) */
ierr = MPI_Barrier(MPI_COMM_WORLD);
```

FIG. 16E

```
                                                                    1600
                                                      PROGRAM line=0;
while(line<N;){
  MatrixVectorMultiply(y, A, x, ist, ien, line);    /* *ARITHMETIC PROCESSING */
Step A  PairBarrier(pair);                           /* *BARRIER SYNCHRONIZATION BETWEEN NODES FORMING PAIR */
        MutualCp(pair);                              /* *MUTUAL HOLDING */
Step B  intermediateCp();                            /* *COPY OF CONCERNED NODE */
        ierr = MPI_Barrier(MPI_COMM_WORLD);          /* *ENTIRE BARRIER SYNCHRONIZATION */
        line += 1;                                   /* *NEXT LINE PROCESS */
}
/* End of mat-vec routine ----------------------- */
/* *CALCULATE TOTAL WHEN ENTIRE PROCESS IS TERMINATED */
ierr = MPI_Allreduce(&y, &y, N, MPI_DOUBLE, MPI_SUM, 0, MPI_COMM_WORLD);
/* *LOGICAL NODE NUMBER 0 CAUSES RESULT TO BE WRITTEN TO STORAGE */
if (myrank == 0) {
  printf("y = ");
  for(i=0;i<N;i+=1) printf("%g ", y(i));
  printf("\n");
}
/* *TERMINATION PROCESS */
ierr = MPI_Finalize();
                                                                    1601
```

FIG. 16F

```
free(basearea);
free(copyarea_my);
free(copyarea_pair);
exit(0);
}

/* Subroutine ------------------------ */
/* MATRIX COMPUTATION FUNCTION */
void MatrixVectorMulti(double y[N], double A[N][N], double x[N], int st, int en, int I)
{
    int i;
    for(i=st; i<en; i++){
        y[i] += A[i][i] * x[i];
    }
}

/* BARRIER FUNCTION BETWEEN 2 NODES */
void PairBarrier(int pair);
    SYNCHRONIZATION PROCESS BETWEEN 2 NODES FORMING PAIR
}
```

PROGRAM ~1600

FIG. 16G

```
PROGRAM  ~1600

/* MUTUAL COPY FUNCTION */
void MutualCp(int pair){

/* MUTUAL TRANSMISSION OF DATA BETWEEN 2 NODES FORMING PAIR */
if((myrank % 2) == 0){
    ierr = MPI_Send(basearea, CA, MPI_DOUBLE, pair, 0, MPI_COMM_WORLD);
    ierr = MPI_Recv(copyarea, CA, MPI_DOUBLE, pair, 0, MPI_COMM_WORLD);
}else{
    ierr = MPI_Recv(copyarea, CA, MPI_DOUBLE, myrank, 0, MPI_COMM_WORLD);
    ierr = MPI_Send(basearea, CA, MPI_DOUBLE, myrank, 0, MPI_COMM_WORLD);
}
}

/* CONCERNED DATA NODE COPY FUNCTION */
void intermediateCp(){

/* COPY OF CONCERNED NODE REGION */
    memcpy(basearea,copyarea_my, CA);
}

/* PROCESSING FUNCTION UPON RECEPTION OF ON ERROR CANCELLATION TRAP */
void On_error(adminservertrap nodeid);

RETURNING OF COMPUTATION PROCESS
*IT IS ASSUMED THAT NORMAL NODE IS STOPPED TO WAIT FOR BARRIER SYNCHRONIZATION. StepA or StepB.
                                                                                                        }~1602
```

FIG. 16H

```
PROGRAM ~1600

/* ACQUIRE PHYSICAL NODE NUMBER OF REDUNDANT NODE */
int spare_nid = nodeid->spare_physical_nodeid;
/* ACQUIRE VIRTUAL NODE NUMBER OF FAILED NODE */
int ver_nid = nodeid->vertial_nodeid;
/* ACQUIRE PHYSICAL NODE NUMBER OF CONCERNED NODE */
int mynode = PhysicalNode;

if( mynode == spare_nid){  /* REDUNDANT NODE PROCESS */
    /*RECEIVE (1) PROGRAM REGION FROM MANAGING SERVER. (PROGRAM INCLUDES REDUNDANT NODE INFORMATION.
    /* INITIALIZE MPI */
    ier = MPI_Init(&argc, &argv);
    ier = MPI_Comm_rank(MPI_COMM_WORLD, &myrank);
    ier = MPI_Comm_size(MPI_COMM_WORLD, &numprocs);
    /* RECEIVE (2) TABLE REGION, (3) DATA REGION FORMING PAIR */
    ier = MPI_Recv(basearea, CA, MPI_DOUBLE, pair, 0, MPI_COMM_WORLD);
    /* ACQUIRE DATA FROM CONCERNED NODE (y), (4) DATA REGION (A), AND (5) DATA REGION (x)
    AND STORE IN "basearea MEMORY */
    *SET PROGRAM COUNTER (PC) TO PC WAITING FOR SAME BARRIER SYNCHRONIZATION AS NORMAL NODE } else{   /* *PROCESS OF NORMAL NODE */
    /* COPY DATA FROM CONCERNED NODE "copyarea_my */
    /* COPY (3) DATA REGION (y), (4) DATA REGION (A), AND (5) DATA REGION (x) AND STORE IN "basearea MEMORY */
    memcpy(dest, src, CA);
}
                                                         ~1602
```

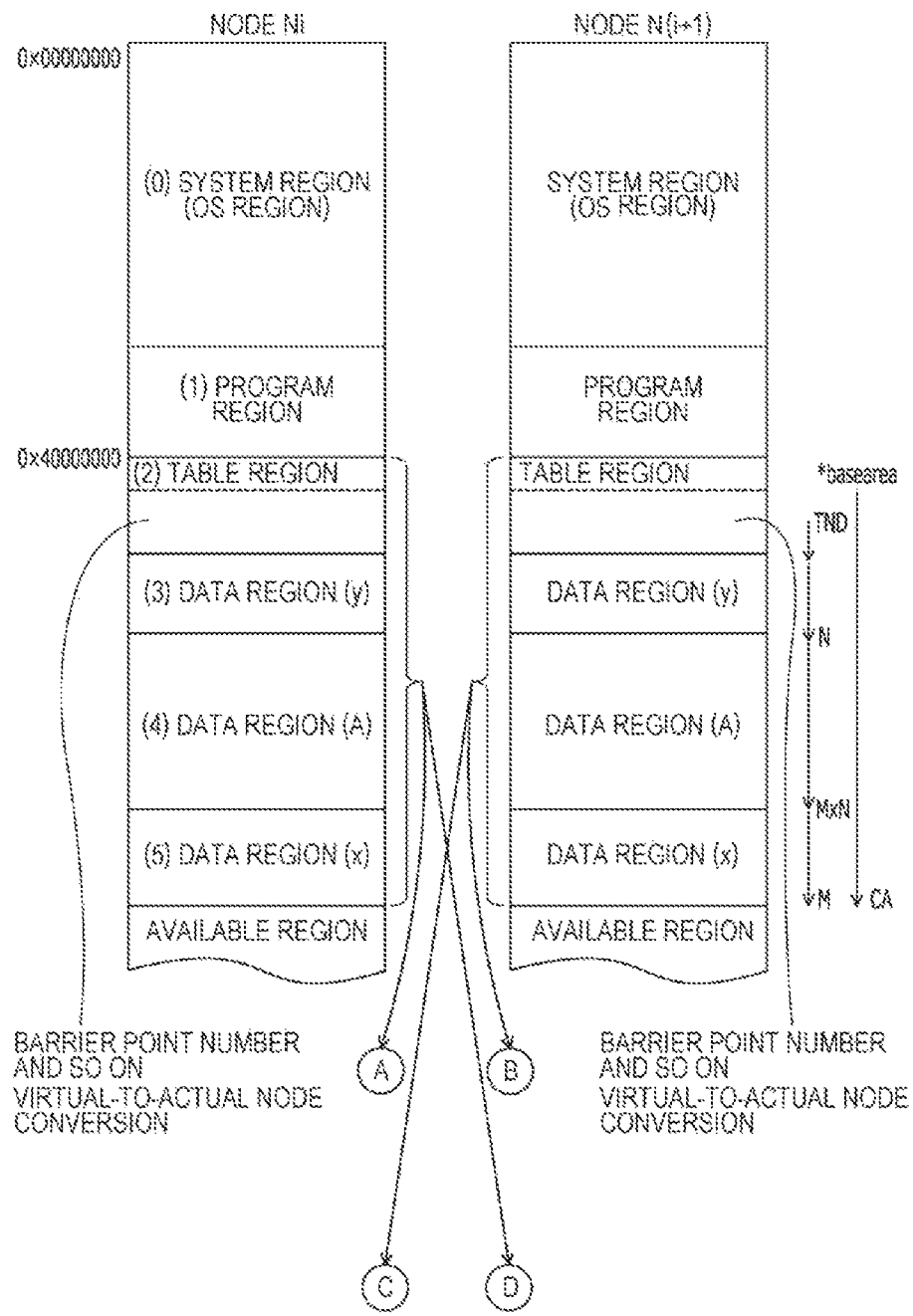

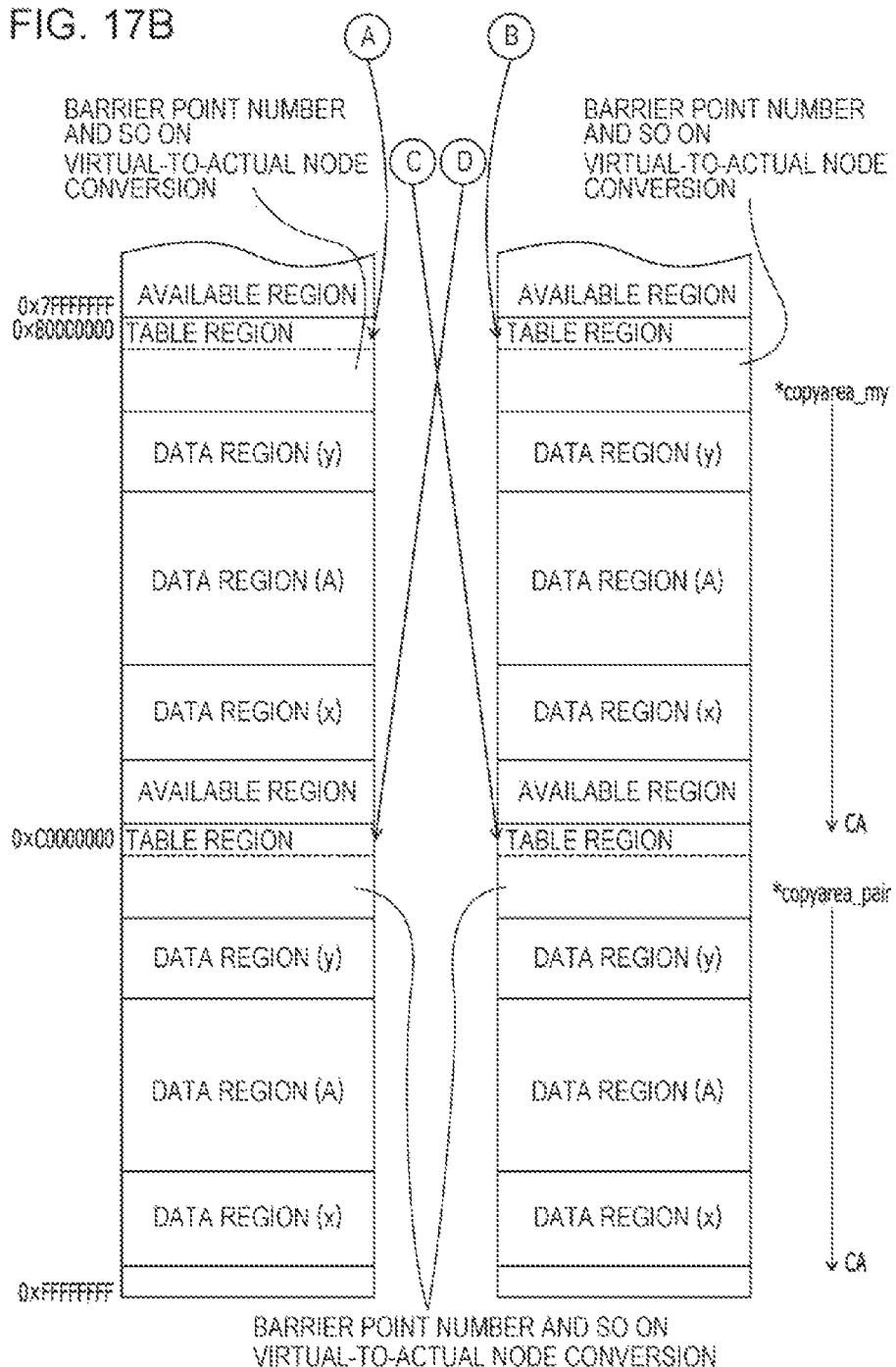

EFFECTIVE BACKUP OF DATA USED BY MULTIPLE NODES EXECUTING PARALLEL PROCESSING

CROSS-REFERENCE TO RELATED APPLICATION

This application is based upon and claims the benefit of priority of the prior Japanese Patent Application No. 2018-198773, filed on Oct. 22, 2018, the entire contents of which are incorporated herein by reference.

FIELD

The embodiment relates to effective backup of data used by multiple nodes executing parallel processing.

BACKGROUND

A job, which is executed in a system with multiple data processing devices (nodes) coupled to each other via a network or is executed in a system used in the high performance computing (HPC) field, has a characteristic in which large-scale data is processed by many nodes for a long time period. When the processing is to be stopped due to a hardware error or the like, intermediate processing results are not guaranteed. Thus, an operation may be executed so that intermediate results are periodically backed up.

As a related technique, for example, there is a technique for using previously captured data to establish a state corresponding to a new checkpoint when a map of data written to a basic memory element is captured by a remote checkpoint memory element during a normal process and the new checkpoint is requested. In addition, there is a technique for acquiring job management information including a node number conversion table indicating an association relationship between a logical node number and a physical node number, and process management information including a logical node number, and generating a restart file for restarting a job.

An example of related art is Japanese National Publication of International Patent Application No. 2000-501216. Another example of related art is Japanese Laid-open Patent Publication No. 2011-186606.

SUMMARY

According to an aspect of the embodiments, a node includes a memory including a first memory region and a second memory region. When barrier synchronization is executed between multiple nodes that include the node and execute processing for a same job, transmit first data indicating an intermediate result of the processing of the node to another node with which processing of the node is to be synchronized first among the multiple nodes, and receive second data indicating an intermediate result of processing of the other node from the other node. The node stores the first data of the node in the first memory region of the memory, and store the second data of the other node in the second memory region of the memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is an explanatory diagram describing a specific example of a target problem;

FIG. 16A is a first explanatory diagram illustrating an example of a program;

FIG. 16B is a second explanatory diagram illustrating the example of the program;

FIG. 16C is a third explanatory diagram illustrating the example of the program;

FIG. 16D is a fourth explanatory diagram illustrating the example of the program;

FIG. 16E is a fifth explanatory diagram illustrating the example of the program;

FIG. 16F is a sixth explanatory diagram illustrating the example of the program;

FIG. 16G is a seventh explanatory diagram illustrating the example of the program;

FIG. 16H is an eighth explanatory diagram illustrating the example of the program;

FIG. 17A is an explanatory diagram illustrating an example of memory maps; and

FIG. 17B is an explanatory diagram illustrating the example of the memory maps.

DESCRIPTION OF EMBODIMENTS

The related techniques have a problem that the length of time it takes to back up intermediate processing results of nodes during parallel execution of a job by the multiple nodes increases.

It is desirable to reduce the length of time taken to execute backup.

Hereinafter, an embodiment of a parallel processing device disclosed herein, a parallel computation execution program disclosed herein, and a backup method disclosed herein is described with reference to the drawings.

Embodiment

First, a configuration of a processing system 100 according to the embodiment is described below.

Figure 1:
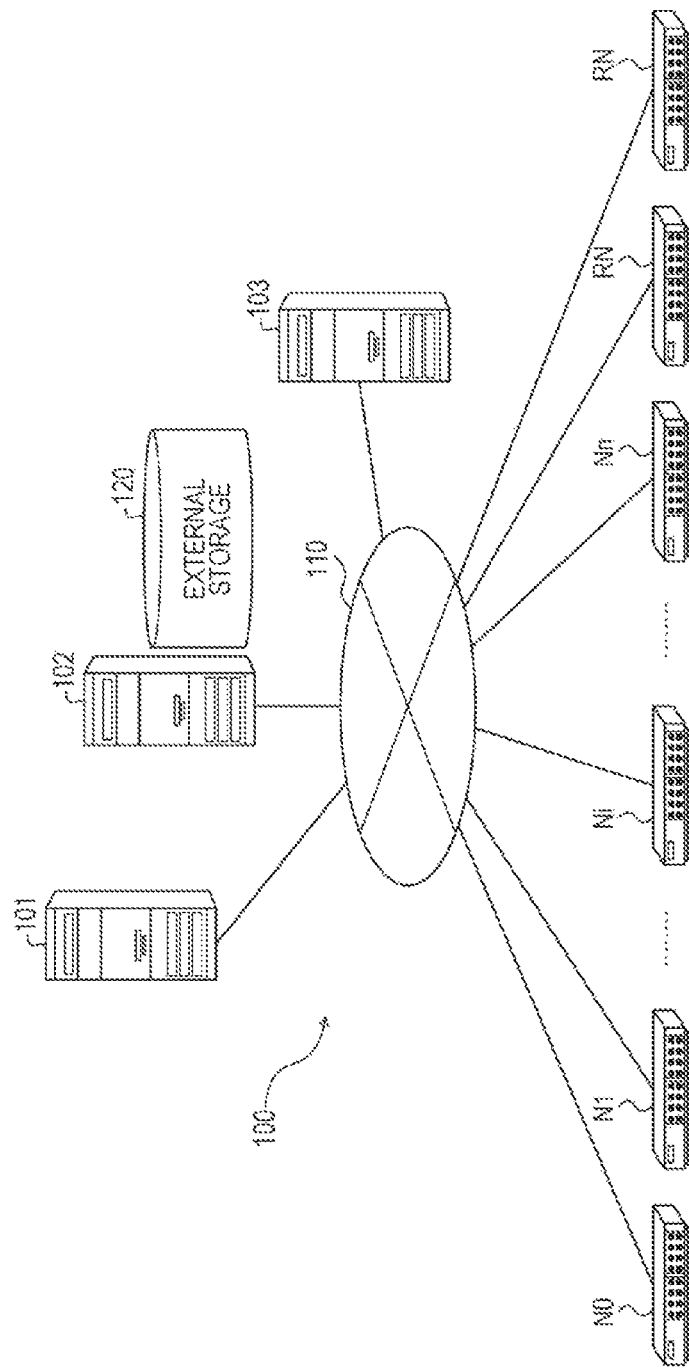
FIG. 1 is an explanatory diagram illustrating an example of a configuration of a processing system.

FIG. 1 is an explanatory diagram illustrating an example of the configuration of the processing system 100. Referring to FIG. 1, the processing system 100 includes nodes N0 to Nn (n is a natural number of 1 or more), a redundant node RN (two redundant nodes in the example illustrated in FIG. 1), a managing server 101, a storage server 102, and a login server 103. In the processing system 100, the nodes N0 to Nn, the redundant node RN, the managing server 101, the storage server 102, and the login server 103 are coupled to and able to communicate with each other via a network 110. The network 110 is, for example, a local area network (LAN), a wide area network (WAN), the Internet, or the like.

Each of the nodes N0 to Nn is a computer for executing a computation process and is an example of a parallel processing device. The nodes N0 to Nn execute computation processes while communicating with each other via, for example, an interconnect. The nodes N0 to Nn are, for example, servers. Each of the nodes N0 to Nn may be enabled by a virtual machine activated in a physical server.

In the following description, an arbitrary node among the nodes N0 to Nn is referred to as "node Ni (i=0, i, . . . , n) in some cases.

The redundant node RN takes over and executes a computation process of a node Ni when the computation process of the node Ni is stopped due to a hardware failure or the like. The managing server 101 is a computer that controls the execution of a job and handles an error when the error occurs during the execution of the job.

The storage server 102 is a computer that has external storage 120 and stores data and a program that are used to execute the job. For example, the storage server 102 loads the data and the program into each of the nodes Ni in order to start the execution of the job. When the execution of the job is terminated, the storage server 102 saves a result of executing the job.

The login server 103 is a computer that is used by a user of the processing system 100 after login by the user. The login server 103 generates and compiles the program. The compiled program and initial data are stored in the storage server 102 from the login server 103 via, for example, the interconnect.

In the example illustrated in FIG. 1, the managing server 101, the storage server 102, and the login server 103 are different computers, but are not limited to this. For example, the managing server 101, the storage server 102, and the login server 103 may be enabled by a single server or a single node Ni. The nodes Ni and the servers 101 to 103 may communicate with each other via a different network from the network between the nodes so that the communication does not affect the computation processes of the nodes Ni.

When a process is to be stopped due to a hardware error or the like during the execution of the job by multiple nodes, a result of the process may not be guaranteed. In this case, when a node in which the hardware error or the like has occurred is removed and the job is executed again from the beginning, all resources (the number of nodes×an execution time) used until the occurrence of the error may become pointless.

When the job is to be executed to process a larger amount of data by a larger number of nodes for a longer time period, a loss that occurs when the processing is stopped is larger. A general-purpose device causes intermediate results of nodes to be periodically stored in external storage. When a hardware error occurs, the general-purpose device restarts a job from an intermediate state of the job to reduce an amount of a process to be re-executed (so-called checkpoint restart function).

However, when the checkpoint restart function is applied to the HPC field, intermediate results are written from many nodes (for example, several tens of thousands of nodes) to storage located at a single location or storage located at some locations in the case where striping is used. Thus, access is concentrated to the storage, it takes a longer time to write (back up) intermediate results to the storage than a processing time of the job, and system performance may be reduced.

Thus, the embodiment describes a backup method of executing mutual backup between nodes forming a pair for every execution of barrier synchronization to inhibit access from being concentrated to the storage when periodical backup is executed and reduce the length of time it takes to execute the backup. An example of a process by the processing system 100 is described with reference to FIG. 2.

Figure 2:
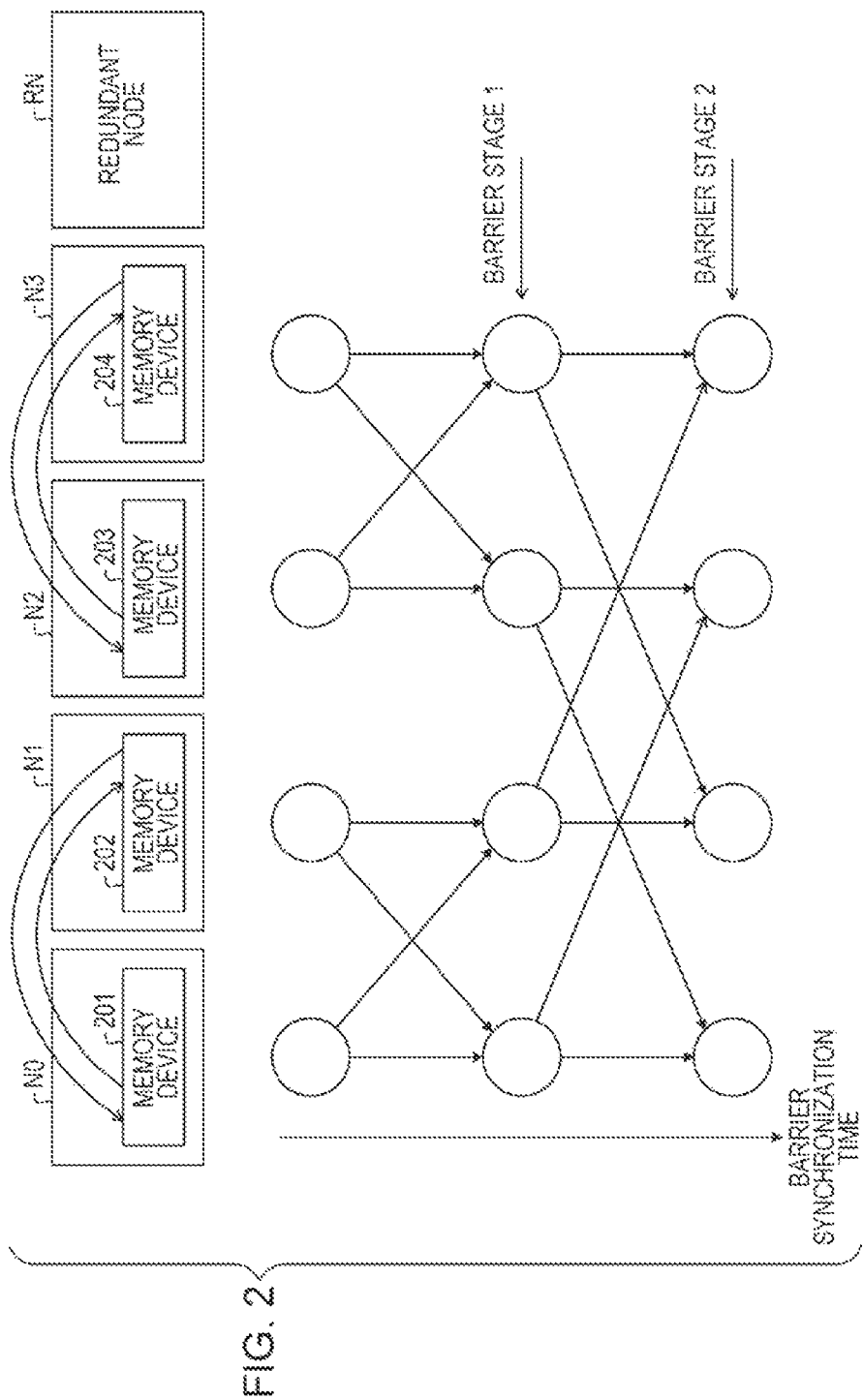
FIG. 2 is an explanatory diagram describing an example of a backup method according to an embodiment.

FIG. 2 is an explanatory diagram illustrating an example of the backup method according to the embodiment. FIG. 2 illustrates the nodes N0 to N3 and the redundant node RN. This example assumes that the nodes N0 to N3 execute the same job in parallel (n=3, total 4 nodes). Each of the nodes Ni executes a computation process while executing a synchronization process by a barrier synchronization mechanism. In FIG. 2, circles indicate states of the nodes N0 to N3.

Barrier synchronization is one of synchronization methods of synchronizing progress statuses of processes (threads or processes) executed in parallel. A barrier synchronization point at which synchronization is established is set for the barrier synchronization. For example, when a process of executing the barrier synchronization reaches the barrier synchronization point, the process is temporarily stopped. When all processes executed in parallel reach the barrier synchronization point, the stopped processes are restarted. Thus, the multiple processes that are executed in parallel are synchronized with each other.

In an example of the embodiment, the barrier synchronization may be implemented using the butterfly barrier. The butterfly barrier is a method of dividing a synchronization process into multiple stages and causing each of processes to transmit and receive signals with another process among the processes in each of the stages to synchronize the processes with each other. Barrier synchronization implemented using the butterfly barrier has been disclosed in, for example, Japanese Laid-open Patent Publication No. 2010-122848.

In the case where the barrier synchronization is executed between the nodes N0 to N3, the nodes N0 and N1 are synchronized with each other first and the nodes N2 and N3 are synchronized with each other first (in a barrier stage 1). Thus, the nodes N0 and N1 are a pair to be synchronized first. Similarly, the nodes N2 and N3 are a pair to be synchronized first.

In this case, the node N0 transmits information of the concerned node N0 to the node N1 and receives information of the node N1 from the node N1. The information of each of the nodes is, for example, checkpoint data including an intermediate result of the node. Then, the node N0 stores the transmitted information of the concerned node N0 in a first memory region of a memory device 201 of the concerned node N0 and stores the received information of the node N1 in a second memory region of the memory device 201.

In addition, the node N1 transmits the information of the concerned node N1 to the node N0 and receives the information of the node N0 from the node N0. Then, the node N1 stores the transmitted information of the concerned node N1 in a first memory region of a memory device 202 of the concerned node N1 and stores the received information of the node N0 in a second memory region of the memory device 202.

Similarly, the node N2 transmits information of the concerned node N2 to the node N3 and receives information of the node N3 from the node N3. Then, the node N2 stores the transmitted information of the concerned node N2 in a first memory region of a memory device 203 of the concerned node N2 and stores the received information of the node N3 in a second memory region of the memory device 203.

In addition, the node N3 transmits the information of the concerned node N3 to the node N2 and receives the information of the node N2 from the node N2. Then, the node N3 stores the transmitted information of the concerned node N3 in a first memory region of a memory device 204 of the concerned node N3 and stores the received information of the node N2 in a second memory region of the memory device 204.

Next, the nodes N0 and N2 are synchronized with each other and the nodes N1 and N3 are synchronized with each other (barrier stage 2). By executing this, the nodes N0 to N3 are synchronized with each other. In a stage (for example, the barrier stage 2) other than the barrier stage 1, the checkpoint data of the nodes is not transmitted and received between the nodes.

As described above, when the barrier synchronization is executed, checkpoint data of each of the pairs of nodes N0 to N3 is held between nodes that form the pair and are to be synchronized with each other in the barrier stage 1. Thus, it may be possible to inhibit access from being concentrated to the storage in the periodical backup during the execution of the job and reduce the length of time it takes to back up the checkpoint data (intermediate results) of the nodes N0 to N3.

When a hardware error or the like occurs, the job may be restarted from an intermediate state of the job using the checkpoint data mutually held between the nodes. For example, when a hardware error occurs in the node N1, the job is restarted from an intermediate state of the job by migrating the information (checkpoint data) of the node N1, stored in the memory device 201 in the node N0, from the node N0 to the redundant node RN.

According to the processing system 100, even when the program is to be stopped due to a hardware failure or the like, the program is not executed again from the beginning and is executed (restarted) again from an intermediate state of the program by implementing a function of saving the intermediate state (checkpoint) and causing the redundant node prepared in advance to take over a process of the node in which the hardware failure has occurred.

Example of Hardware Configuration of Node Ni

Figure 3:
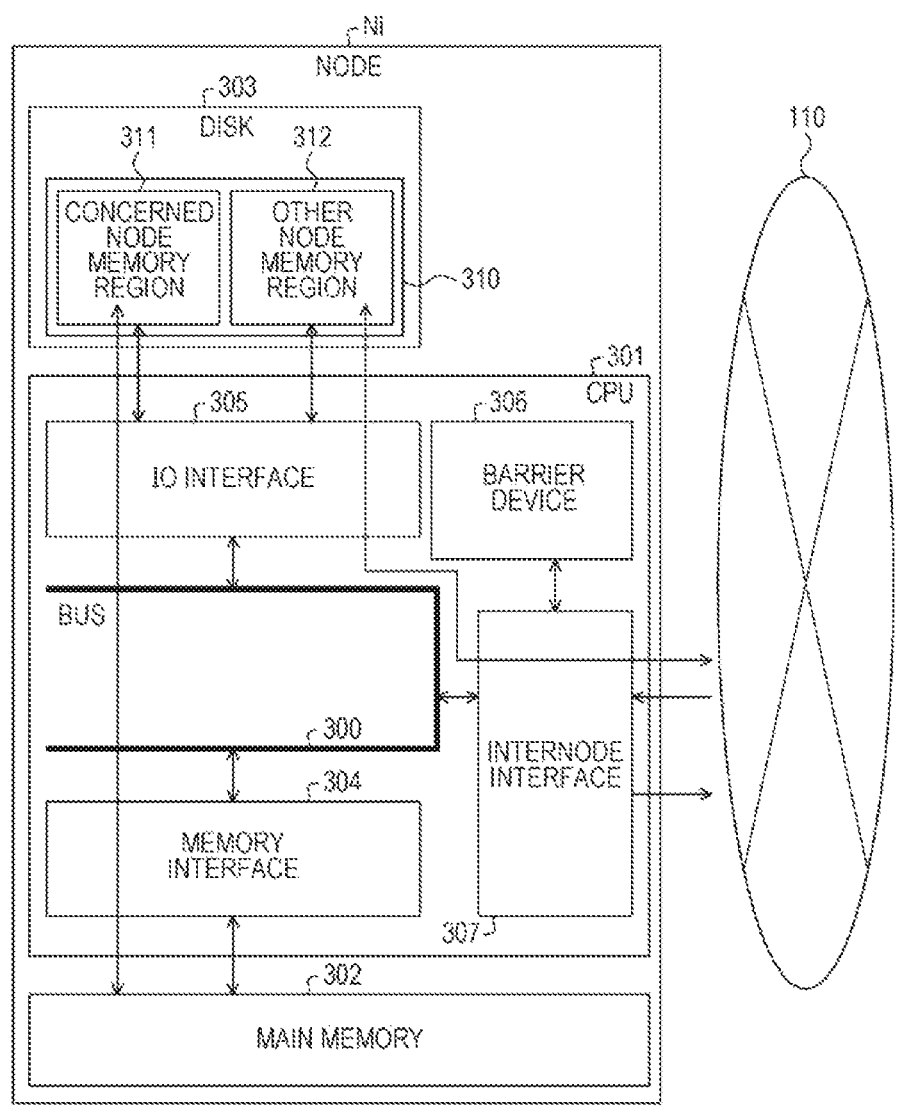
FIG. 3 is a block diagram illustrating an example of a hardware configuration of a node.

FIG. 3 is a block diagram illustrating an example of a hardware configuration of a node Ni. In FIG. 3, the node Ni includes a central processing unit (CPU) 301, a main memory 302, and a disk 303. The CPU 301 includes a main interface 304, an input and output (IO) interface 305, a barrier device 306, and an internode interface 307. The constituent units 304 to 307 are coupled to each other via a bus 300.

The CPU 301 controls the entire node Ni. The CPU 301 may include a plurality of cores. The main memory 302 includes, for example, a read only memory (ROM), a random-access memory (RAM), and a flash ROM. The CPU 301 accesses the main memory 302 via the memory interface 304. For example, various programs are stored in the flash ROM and the ROM, and the RAM is used as a work area of the CPU 301. The programs stored in the main memory 302 are loaded into the CPU 301 and cause the CPU 301 to execute a coded process.

The disk 303 is a memory device for storing various information. For example, the disk 303 may be a hard disk drive (HDD), a solid state drive (SSD), or the like. The CPU 301 accesses the disk 303 via the IO interface 305.

The disk 303 has a small storage region 310. The small storage region 310 includes a concerned node memory region 311 and another node memory region 312. The small storage region 310 has, for example, a memory capacity that is up to twice as large as the memory capacity of the main memory 302. The concerned node memory region 311 corresponds to any of the first memory regions described with reference to FIG. 2. The other node memory region 312 corresponds to any of the second memory regions described with reference to FIG. 2. The disk 303 is an example of any of the memory devices 201 to 204 illustrated in FIG. 2.

The barrier device 306 executes the barrier synchronization. For example, the barrier device 306 transmits information of a state of the concerned node Ni to another node via the interconnect, receives information of a state of the other node from the other node, and detects how much an entire computation process is progressed.

The internode interface 307 is coupled to the network 110 via a communication line, and further coupled to another computer via the network 110. In addition, the internode interface 307 functions as an interface between the network 110 and the inside of the concerned node Ni, and controls input and output of data from and to the other computer.

The barrier device 306 may be installed in a unit different from the CPU 301 or may be enabled by software. The small storage region 310 may be included in the main memory 302, a memory card (not illustrated), or the like. Each of the redundant node RN, the managing server 101, the storage server 102, and the login server 103, which are illustrated in FIG. 1, may be enabled by a hardware configuration that is the same as or similar to the hardware configuration of the node Ni. Each of the managing server 101, the storage server 102, and the login server 103, however, may not include the barrier device 306.

Example of Functional Configuration of Node Ni

Figure 4:
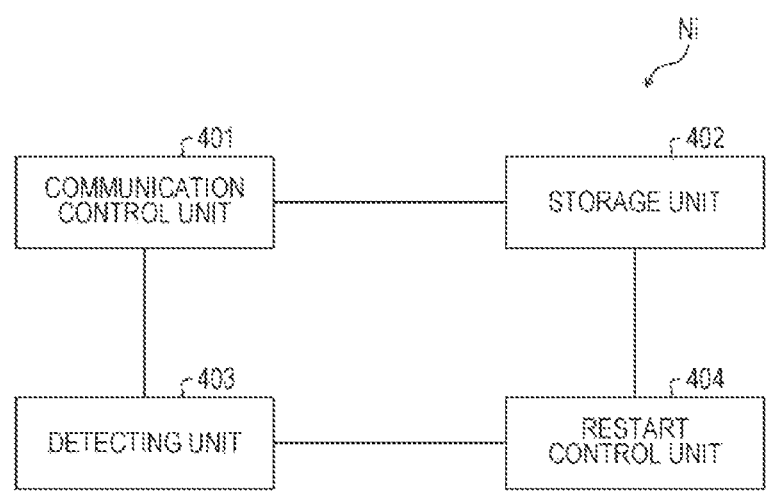
FIG. 4 is a block diagram illustrating an example of a functional configuration of the node.

FIG. 4 is a block diagram illustrating an example of a functional configuration of the node Ni. In FIG. 4, the node Ni includes a communication control unit 401, a storage unit 402, a detecting unit 403, and a restart control unit 404. The communication control unit 401, the storage unit 402, the detecting unit 403, and the restart control unit 404 are functions serving as a control unit and are enabled by, for example, causing the CPU 301 to execute a program stored in a memory device, such as the main memory 302 illustrated in FIG. 3, the disk 303 illustrated in FIG. 3, or the like. Processing results of the functional units 401 to 404 are stored, for example, in a memory device, such as the main memory 302 or the disk 303.

When the barrier synchronization is executed between the nodes N0 to Nn for executing the same job, the communication control unit 401 transmits information of the concerned node Ni to another node, which is among the nodes N0 to Nn and is to be synchronized with the concerned node Ni first, and receives information of the other node from the other node. In this case, the information of the nodes Ni is intermediate results of the nodes Ni or is checkpoint data including results of computation processes executed by the nodes Ni before the execution of the barrier synchronization.

The other node is among the nodes N0 to Nn and is a node Nj (j≠i, j=0, 1, . . . , n) among nodes included in a group to be synchronized with the concerned node Ni first. The group to be synchronized with the concerned node Ni first is to be synchronized in the first stage (barrier stage 1) of the barrier synchronization. The number of nodes included in the group to be synchronized with the concerned node Ni first is 2 or more and may be an even number or an odd number.

An example of operations of nodes Ni in the case where the number of nodes that are among the nodes N0 to Nn and are included in the group to be synchronized with the concerned node first is "2" is described later with reference to FIG. 5. An example of operations of nodes Ni in the case where the number of nodes that are among the nodes N0 to Nn and are included in the group to be synchronized with the concerned node first is "3" is described later with reference to FIG. 7.

In the following description, another node that is among the nodes N0 to Nn and is to be synchronized with the concerned node first is referred to as "other node forming a pair with the concerned node in some cases. Information of the other node to be synchronized with the concerned node first is stored, for example, in a node ID table (not illustrated) in advance. The node ID table is enabled, for example, by a memory device, such as the main memory 302 or the disk 303.

For example, when a process, executed by the concerned node, of the job reaches the barrier synchronization point during the execution of the job, the communication control unit 401 synchronizes the concerned node with the other node forming the pair with the concerned node. For example, the communication control unit 401 uses the barrier device 306 illustrated in FIG. 3 to notify the states of the nodes between the nodes, thereby synchronizing the concerned node with the other node forming the pair with the concerned node.

Then, when the synchronization with the other node forming the pair with the concerned node is completed, the communication control unit 401 reads data from the main memory 302 and transmits the read data as checkpoint data to the other node. In addition, after the synchronization with the other node forming the pair with the concerned node is completed, the communication control unit 401 receives checkpoint data from the other node.

The checkpoint data of the other node is read from the main memory 302 of the other node. The data to be read may be all data within the main memory 302 or may be data stored in the main memory 302 and excluding data stored in a system region of the main memory 302.

When processes, executed by nodes Ni, of the job reach the barrier synchronization point, the processes, executed by the nodes Ni, of the job are stopped. When the barrier synchronization is established between the nodes N0 to Nn, the stopped processes of the job are restarted in the nodes Ni.

The storage unit 402 causes the information, transmitted by the communication control unit 401, of the concerned node to be stored in the first memory region within the memory device included in the concerned node. The storage unit 402 causes the information, received by the communication control unit 401, of the other node to be stored in the second memory region within the memory device included in the concerned node.

For example, the storage unit 402 causes the transmitted checkpoint data (data within the main memory 302 included in the concerned node) of the concerned node to be stored in the concerned node memory region 311 of the small storage region 310 within the disk 303 illustrated in FIG. 3. In addition, the storage unit 402 causes the received checkpoint data (data within the main memory 302 included in the other node) of the other node to be stored in the other node memory region 312 of the small storage region 310 within the disk 303.

Thus, when the barrier synchronization is executed between the nodes N0 to Nn executing the same job, data (checkpoint data) within the main memory 302 of each of the nodes to be synchronized with each other in the first stage (barrier stage 1) of the barrier synchronization is backed up in the main memory 302 of another node among the nodes.

The job that is executed by the nodes N0 to Nn is divided and executed, for example, so that an execution time of a process by each of the nodes Ni after the division is longer than the length of time it takes to transmit checkpoint data (data of the main memories 302) of each of the nodes Ni to another node among the nodes Ni.

The detecting unit 403 detects that a failure has occurred in another node that is among the nodes N0 to Nn and is to be synchronized with the concerned node first. For example, the detecting unit 403 determines that a failure has occurred in a node among the nodes N0 to Nn, in response to the reception of an ON ERROR cancellation trap from the managing server 101.

The ON ERROR cancellation trap is information notifying the existence of the node in which the failure (unrecoverable error) has occurred. The ON ERROR cancellation trap includes information (for example, a node number) of the node in which the failure has occurred, and information (for example, physical node information) of the redundant node RN that takes over a computation process of the node in which the failure has occurred.

Then, the detecting unit 403 determines whether the node that is identified by the ON ERROR cancellation trap and in which the failure has occurred is the other node forming the pair with the concerned node. When the node in which the failure has occurred is the other node forming the pair with the concerned node, the detecting unit 403 detects that the failure has occurred in the other node.

When the detecting unit 403 detects that the failure has occurred in the other node that is among the nodes N0 to Nn and is to be synchronized with the concerned node first, the communication control unit 401 transmits the information, stored in the second memory region within the memory device of the concerned device, of the other node to the redundant node RN that takes over the process of the other node.

For example, when a failure has occurred in the other node forming the pair with the concerned node, the communication control unit 401 reads the checkpoint data of the other node from the other node memory region 312 of the small storage region 310 included in the disk 303. Then, the communication control unit 401 transmits the read checkpoint data of the other node to the redundant node RN identified from the ON ERROR cancellation trap. In this case, the communication control unit 401 uses the information (for example, physical node information) of the redundant node RN to update the node ID table (not illustrated).

In addition, the program of the job is loaded into the redundant node RN from the storage server 102 under control by the managing server 101. As a result, the redundant node RN is able to take over the process of the other node in which the failure has occurred, and the redundant node RN is set in a node group for executing the job in parallel.

When a failure has occurred in the other node forming the pair with the concerned node, the communication control unit 401 may read the checkpoint data of the concerned node from the concerned node memory region 311 of the small storage region 310. Then, the communication control unit 401 may transmit the read checkpoint data of the concerned node and the checkpoint data of the other node to the redundant node RN. Thus, the redundant node RN may hold the checkpoint data of the nodes Ni.

The restart control unit 404 restarts executing the job based on the information, stored in the first memory region within the memory device of the concerned node, of the concerned node. For example, the restart control unit 404 recognizes the redundant node RN for taking over the process of the other node in which the failure has occurred. The other node in which the failure has occurred is switched to the redundant node RN, and the node group for executing the same job in parallel is updated to a node group including the redundant node RN and the nodes, which are among the nodes N0 to Nn and exclude the node in which the failure has occurred.

Then, the restart control unit 404 restores a restart point of the job based on the checkpoint data, stored in the concerned node memory region 311 of the small storage region 310 within the disk 303, of the concerned node. Then, after the restoration of restart points is completed in all the nodes, the restart control unit 404 restarts executing the job by executing a process (routine) again during which an error has occurred.

In the aforementioned description, the communication control unit 401 uses the barrier device 306 to notify the states of the nodes between the nodes, thereby synchronizing the concerned node with the other node forming the pair with the concerned node. The communication control unit 401, however, is not limited to this. For example, the communication control unit 401 may transmit the information of the concerned node to the other node at the time of the synchronization of the concerned node with the other node. The communication control unit 401 may determine that the synchronization with the other node has been completed, in response to the transmission of the information of the concerned node to the other node and the reception of the information of the other node from the other node.

For example, when the process, executed by the concerned node, of the job reaches the barrier synchronization point during the execution of the job, the communication control unit 401 reads data from the main memory 302 and transmits the read data as checkpoint data to the other node. Then, the communication control unit 401 may determine that the synchronization with the other node has been completed, in response to the transmission of the checkpoint data of the concerned node to the other node and the reception of the checkpoint data of the other node from the other node.

By executing this, the concerned node is synchronized with the other node forming the pair with the concerned node without notifying the states of the nodes between the nodes. The concerned node may determine the completion of the first stage (barrier stage 1) of the barrier synchronization in response to the completion of the mutual holding of the checkpoint data between the nodes and reduce communication related to the confirmation of the synchronization between the nodes. The communication control unit 401 may determine that the synchronization with the other node has been completed when the checkpoint data of the concerned node is stored in the concerned node memory region 311 and the checkpoint data of the other node is stored in the other node memory region 312.

In addition, the communication control unit 401 may transmit the information of the concerned node to the other node to be synchronized with the concerned node first and receive the information of the other node from the other node for every execution of the barrier synchronization. By executing this, checkpoint data may be mutually held between nodes to be synchronized with each other in the first stage of the barrier synchronization for every execution of the barrier synchronization during the execution of the job by the nodes N0 to Nn.

In addition, the communication control unit 401 may transmit the information of the concerned node to the other node and receive the information of the other node from the other node for every execution of the barrier synchronization after a predetermined time period T elapses after the start of the execution of the job. Before the predetermined time period T elapses after the start of the execution of the job, even at the time of the execution of the barrier synchronization, checkpoint data of the nodes is not mutually held between the nodes. The predetermined time period T may be set to an arbitrary time period.

Since an advantage of backup executed within a certain time period after the start of the execution of the job is small, the mutual holding of checkpoint data between the nodes may be delayed. An example of operations in the case where checkpoint data is mutually held between nodes after the predetermined time period T elapses after the start of the execution of the job is described later with reference to FIG. 6.

Example of Operations of Node Ni

Next, an example of operations of a node Ni in the case where checkpoint data is mutually held in nodes included in a group to be synchronized first when the barrier synchronization is executed is described below. The following example is described below. In the example, the nodes included in the group to be synchronized first are the "nodes N0 and N1", and checkpoint data is mutually held between the two nodes.

Figure 5:
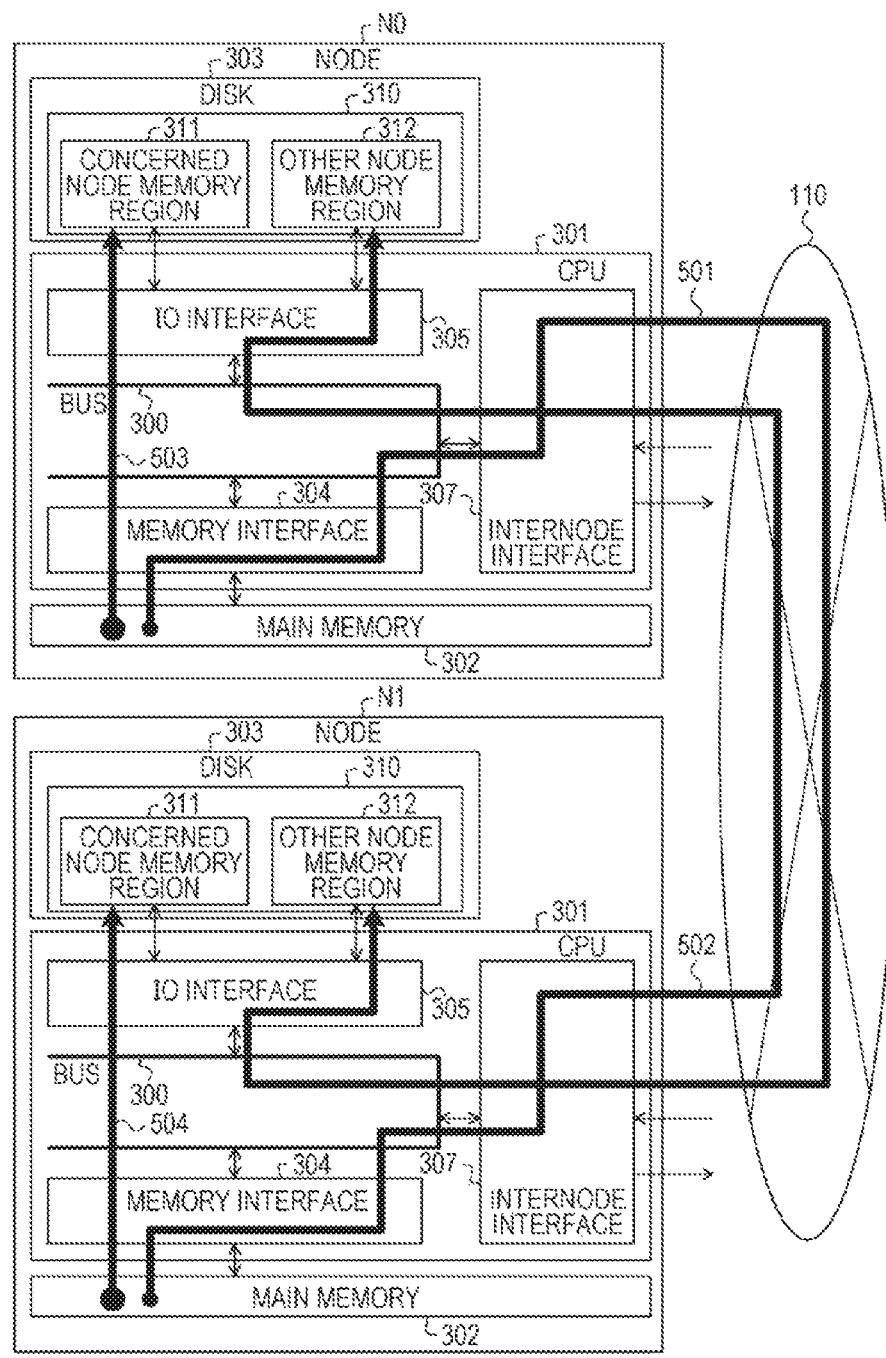
FIG. 5 is a first explanatory diagram illustrating an example of operations of nodes.

FIG. 5 is a first explanatory diagram illustrating an example of operations of the nodes Ni. FIG. 5 illustrates the nodes N0 and N1 that are to be synchronized with each other first when the barrier synchronization is executed. FIG. 5 omits illustration of the barrier devices 306 of the nodes N0 and N1. The example of the operations of the nodes N0 and N1 in the case where the checkpoint data is mutually held between the nodes N0 and N1 is described below.

When a process, executed by the node N0, of the job reaches the barrier synchronization point during the execution of the job, the node N0 is synchronized with the node N1 forming a pair with the concerned node N0. When the synchronization of the node N0 with the node N1 is completed, the node N0 reads data from the main memory 302 of the node N0 and transmits the read data as checkpoint data of the concerned node N0 to the node N1 (refer to an arrow 501 illustrated in FIG. 5).

Similarly, when a process, executed by the node N1, of the job reaches the barrier synchronization point during the execution of the job, the node N1 is synchronized with the node N0 forming the pair with the concerned node Ni. When the synchronization of the node Ni with the node N0 is completed, the node N1 reads data from the main memory 302 of the node N1 and transmits the read data as checkpoint data of the concerned node Ni to the node N0 (refer to an arrow 502 illustrated in FIG. 5).

Then, the node N0 stores the transmitted checkpoint data (data within the main memory 302 of the node N0) of the concerned node N0 to be stored in the concerned node memory region 311 within the disk 303 of the node N0 (refer to an arrow 503 illustrated in FIG. 5). In addition, the node N0 stores the received checkpoint data (data within the main memory 302 of the node N1) of the node N1 to be stored in the other node memory region 312 within the disk 303 of the node N0 (refer to the arrow 502 illustrated in FIG. 5).

Similarly, the node N1 stores the transmitted checkpoint data (data within the main memory 302 of the node N1) of the concerned node N1 in the concerned node memory region 311 within the disk 303 of the node N1 (refer to an arrow 504 illustrated in FIG. 5). In addition, the node N1 stores the received checkpoint data (data within the main memory 302 of the node N0) of the node N0 to be stored in the other node memory region 312 within the disk 303 of the node Ni (refer to the arrow 501 illustrated in FIG. 5).

The length of time it takes to mutually hold the checkpoint data between the nodes N0 and N1 is described below. The following case assumes that each of the main memories 302 of the nodes N0 and N1 has a memory capacity of "64 GB" and that a bandwidth between the CPU 301 and the disk 303 in each of the nodes N0 and N1 is "100 MB/sec". In addition, it is assumed that a main memory bandwidth and a network bandwidth are larger than the bandwidth between the CPU 301 and the disk 303 in each of the nodes N0 and N1.

In this case, the length of time it takes to mutually hold the checkpoint data between the nodes N0 and N1 is approximately 22 minutes (=64 GB×2/100 MB/sec/60=21.33 (minutes)+latency ($\alpha$). It is, therefore, desirable that a time interval between the transmission of the checkpoint data of the node N0 to the node N1 and the transmission of the checkpoint data of the node Ni to the node N0 be equal to or longer than (22+a) minutes.

The example assumes that the nodes N0 and N1 transmit all the data within the main memories 302 to each other. However, only data (arrays) to be used for the processes of the nodes N0 and N1 may be extracted and stored in the small storage regions 310 of the nodes N1 and NO. Thus, the length of time it takes to mutually hold the checkpoint data between the nodes N0 and N1 may be reduced.

Case where Checkpoint Data is Mutually Held after Predetermined Time Period T Elapses Next, an example of operations in the case where checkpoint data is mutually held between nodes after the predetermined time period T elapses after the start of the execution of the job is described below.

Figure 6:
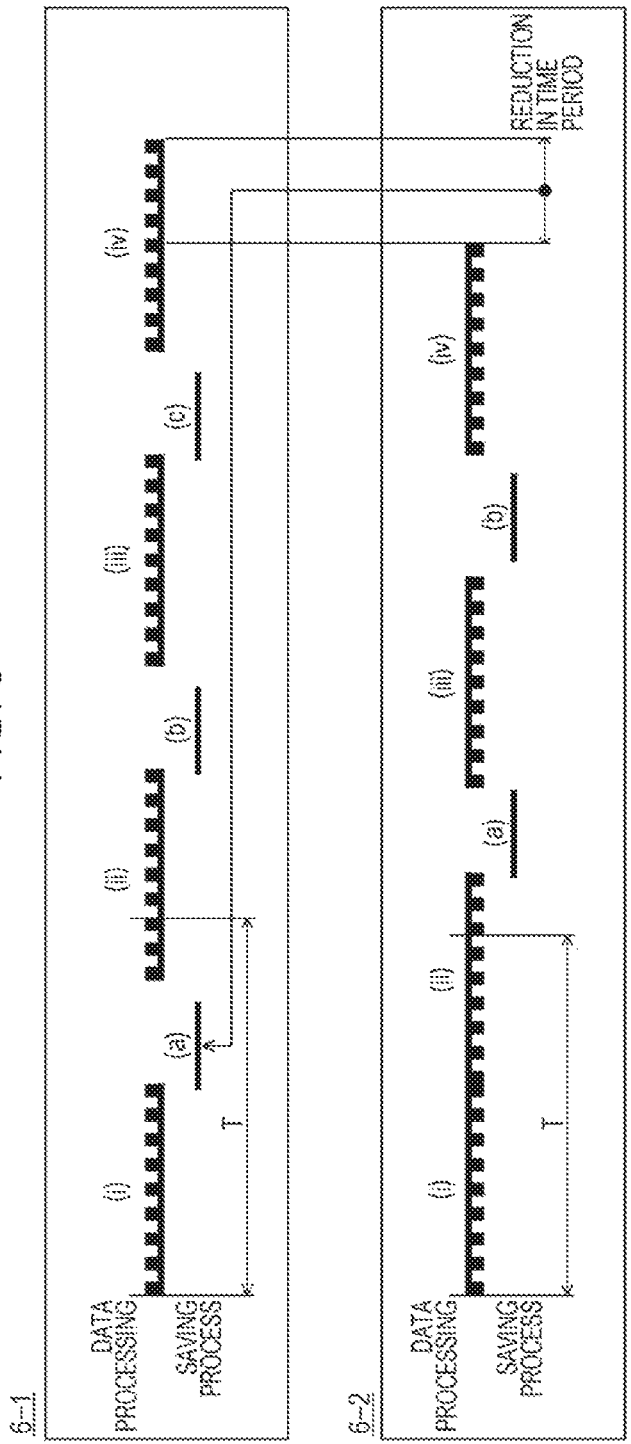
FIG. 6 is a second explanatory diagram illustrating an example of operations of a node.

FIG. 6 is a second explanatory diagram illustrating an example of operations of a node Ni. 6-1 and 6-2 illustrated in FIG. 6 indicate the length of time it takes to execute data processing by the node Ni and the length of time it takes to execute each saving process by the node Ni. The data processing corresponds to a computation process, executed by the node Ni, of the job. Each of the saving processes corresponds to a process, to be executed by the node Ni, of mutually holding checkpoint data between the node Ni and another node.

6-1 indicates an example of operations in the case where the checkpoint data is mutually held between the nodes for every execution of the barrier synchronization during the execution of the job. For example, every time data processing (i), (ii), and (iii) is completed, saving processes (a), (b), and (c) is executed.

6-2 indicates an example of operations in the case where the checkpoint data is mutually held between the nodes for every execution of the barrier synchronization after the predetermined time period T elapses after the start of the execution of the job. In this case, the predetermined time period T elapses during the execution of the data processing (ii). In this case, when the execution of the data processing (i) is completed, a saving process is not executed. Every time the execution of the data processing (ii) and (iii) is completed, the saving processes (a) and (b) is executed.

For example, it is assumed that it takes 24 hours to complete an entire process, a saving process is executed at time intervals of 1 hour (or the barrier synchronization is executed at time intervals of 1 hour), and it takes 10 minutes to completely execute each saving process, as indicated by 6-1. In this case, the length of time it takes to complete the job is "27.8 hours=24×60+23×10=1670 minutes".

In addition, it is assumed that the predetermined time period T is "10 hours" and that the checkpoint data is mutually held between the nodes for every execution of the barrier synchronization after 10 hours elapse after the start of the execution of the job, as indicated by 6-2. In this case, the length of time it takes to complete the job is "25.8 hours that is nearly equal to 24×60+11×10=1550 minutes".

Before the predetermined time period T elapses after the start of the execution of the job, even at the execution of the barrier synchronization, the checkpoint data of the nodes is not mutually held between the nodes. Thus, the length of time it takes to complete the execution of the job may be reduced.

Example of Operations in Case Where Number of Nodes Included in Each Group to be Synchronized First is "3"

An example of operations of the nodes Ni in the case where the number of nodes that are among the nodes N0 to Nn and are included in each group to be synchronized first is "3" is described below.

Figure 7:
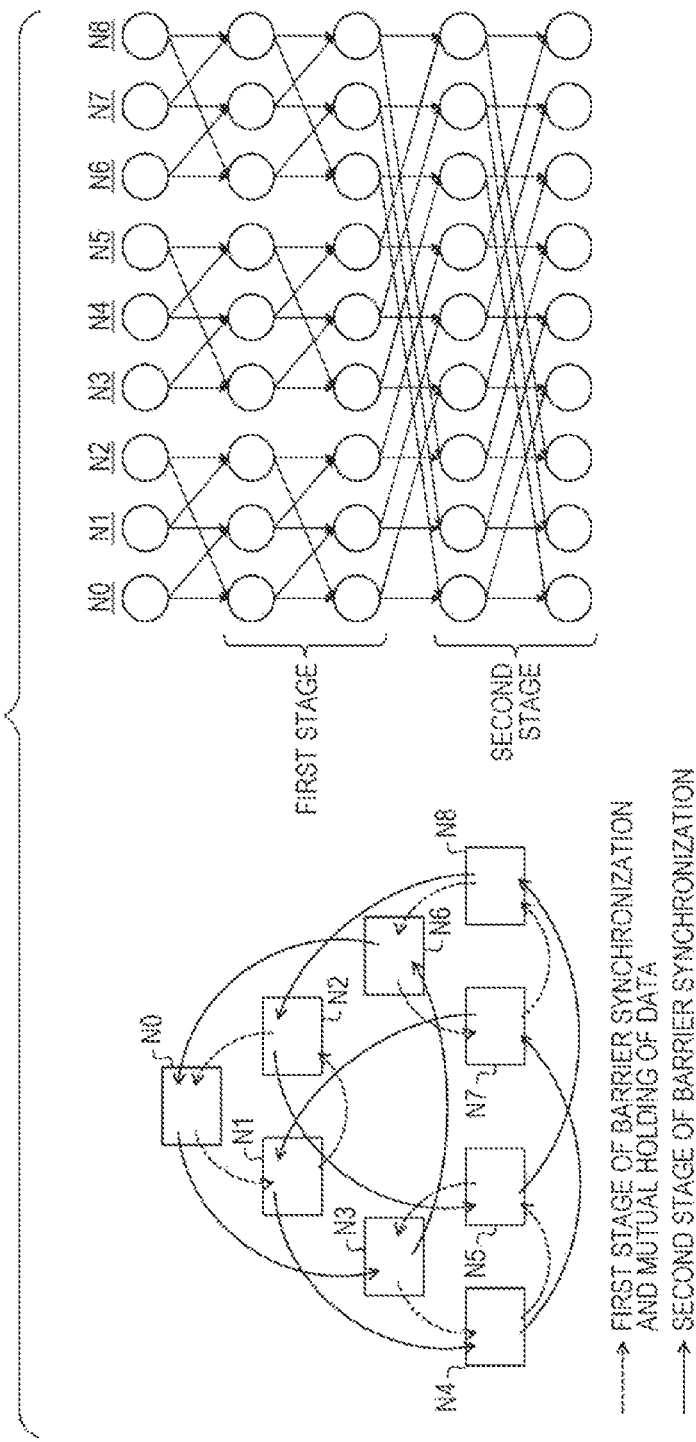
FIG. 7 is a third explanatory diagram illustrating an example of operations of nodes.

FIG. 7 is a third explanatory diagram illustrating the example of the operations of the nodes Ni. FIG. 7 illustrates the nodes N0 to N8. This example assumes that the nodes N0 to N8 execute the same job in parallel (n=8). It is assumed that groups to be synchronized first are a group of the "nodes N0, N1, and N2", a group of the "nodes N3, N4, and N5", and a group of the "nodes N6, N7, and N8". In FIG. 7, circles indicate the states of the nodes N0 to N8.

In the case where the barrier synchronization is executed between the nodes N0 to N8, the nodes N0, N1, and N2 are synchronized with each other, the nodes N3, N4, and N5 are synchronized with each other, and the nodes N6, N7, and N8 are synchronized with each other (in the barrier stage 1). An example of operations for mutually holding checkpoint data between the nodes NO, N1, and N2 included in the group is described below.

For example, the node N0 transmits the checkpoint data of the concerned node N0 to the node N1 and receives checkpoint data of the node N2 from the node N2 in order to synchronize the nodes N0, N1, and N2 with each other. Then, the node N0 stores the transmitted checkpoint data of the concerned node N0 in the concerned node memory region 311 of the node N0 and stores the received checkpoint data of the node N2 in the other node memory region 312 of the node N0.

In addition, for example, the node N1 transmits the checkpoint data of the concerned node N1 to the node N2 and receives the checkpoint data of the node N0 from the node N0 in order to synchronize the nodes N0, N1, and N2 with each other. Then, the node N1 stores the transmitted checkpoint data of the concerned node N1 in the concerned node memory region 311 of the node N1 and stores the received checkpoint data of the node N0 in the other node memory region 312 of the node Ni.

In addition, for example, the node N2 transmits the checkpoint data of the concerned node N2 to the node N0 and receives the checkpoint data of the node N1 from the node N1 in order to synchronize the nodes N0, N1, and N2 with each other. Then, the node N2 stores the transmitted checkpoint data of the concerned node N2 in the concerned node memory region 311 of the node N2 and stores the received checkpoint data of the node N1 in the other node memory region 312 of the node N2.

In this manner, even when the number of nodes included in a group to be synchronized first is "3", checkpoint data of the nodes may be mutually held between the nodes of the group. The configuration of the processing system 100 may be expanded to a configuration in which the number of nodes included in a group that is to be synchronized first when the barrier synchronization is executed is a number other than 2. Furthermore, the configuration may be expanded to a configuration in which the number of all the nodes is not an even number. The length of time it takes to synchronize 3 nodes with each other may increase, compared with a configuration in which the number of nodes included in a group to be synchronized first is "2".

Another Example of Small Storage Region 310

Next, another example of the small storage region 310 within the disk 303 included in each node Ni is described. An example in which the number of nodes that are among the nodes N0 to Nn and included in a group to be synchronized first is "3" is described below.

Figure 8:
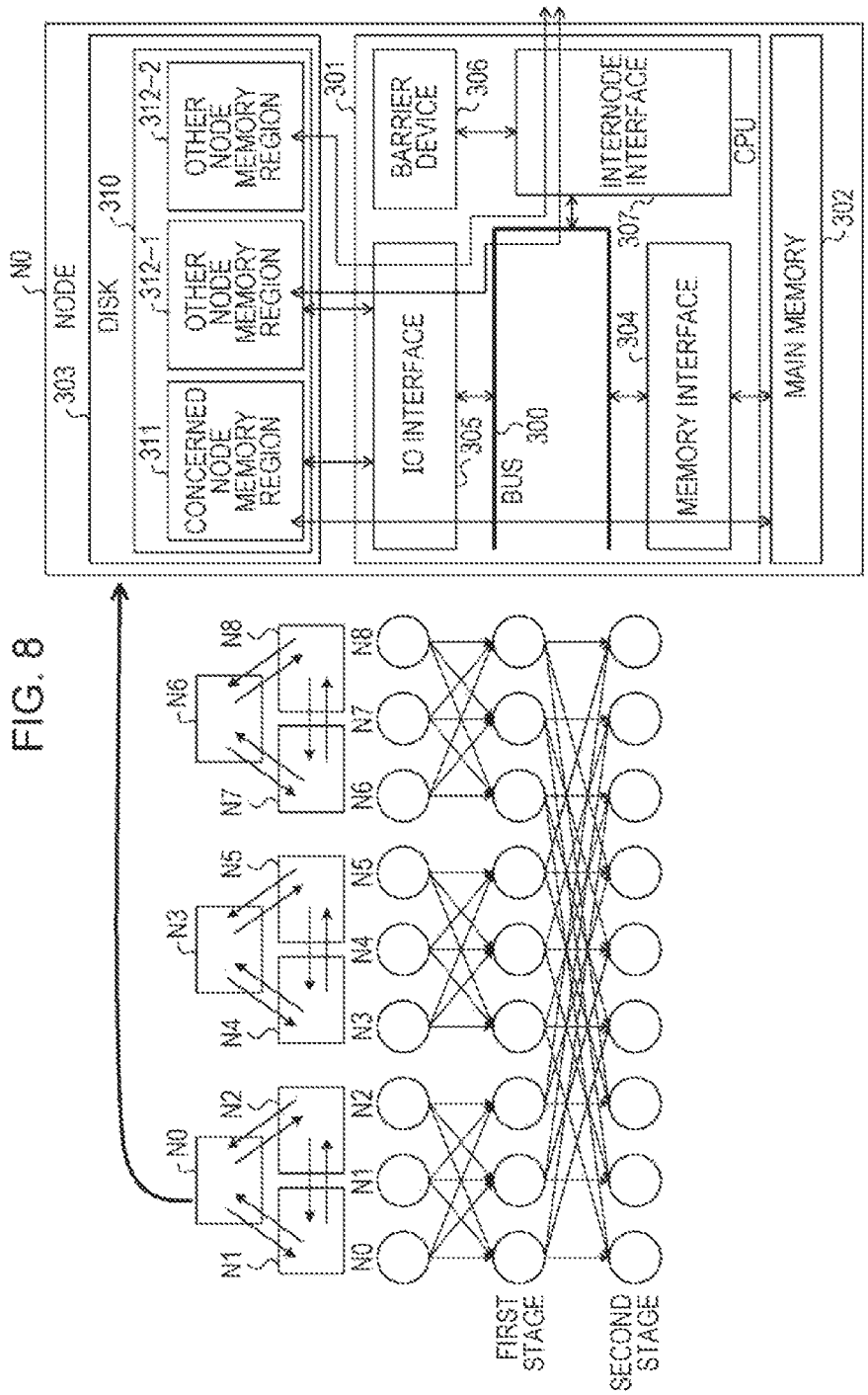
FIG. 8 is a block diagram illustrating an example of a small storage region.

FIG. 8 is a block diagram illustrating another example of the small storage region 310. In FIG. 8, the small storage region 310 includes a concerned node memory region 311, another node memory region 312-1, and another node memory region 312-2. The small storage region 310 has the memory regions for storing checkpoint data of other nodes included in the group.

In this case, when the barrier synchronization is executed, the communication control unit 401 of the node Ni transmits information of the concerned node Ni to the other nodes included in the group and receives information of the other nodes from the other nodes. Then, the storage unit 402 causes the transmitted information of the concerned node Ni to be stored in the first memory region within the memory device of the concerned node Ni. In addition, the storage unit 402 causes the received information of the other nodes to be stored in the second memory regions included in the memory device of the concerned node Ni and corresponding to the other nodes.

Specific processing details of the node N0 included in the group of the nodes N0, N1, and N2 are described as an example. For example, when the process, executed by the node N0, of the job reaches the barrier synchronization point, the node N0 reads data from the main memory 302 of the N0 and transmits the read data as checkpoint data to the nodes N1 and N2. In addition, after the process, executed by the node Ni, of the job and a process, executed by the node N2, of the job reach the barrier synchronization point, the node N0 receives the checkpoint data of the nodes N1 and N2 from the nodes N1 and N2.

Then, the node N0 stores the transmitted checkpoint data (data within the main memory 302 of the concerned node N0) of the concerned node N0 to be stored in the concerned node memory region 311 of the small storage region 310 of the concerned node N0. In addition, the node N0 stores the received checkpoint data (data within the main memory 302 of the node N1) of the node N1 to be stored in the other node memory region 312-1 of the small storage region 310 of the concerned node N0. In addition, the node N0 stores the received checkpoint data (data within the main memory 302 of the node N2) of the node N2 to be stored in the other node memory region 312-2 of the small storage region 310 of the concerned node N0.

Thus, the node N0 holds the checkpoint data of the other nodes (nodes N1 and N2) included in the group to be synchronized first. For example, even when hardware failures simultaneously occur in the nodes N1 and N2 included in the group, two redundant nodes RN are prepared and the job may be executed again based on the information stored in the small storage region 310 of the node N0.

The node N0 may determine the completion of the first stage (barrier stage 1) of the barrier synchronization when the checkpoint data of the nodes is mutually held between the nodes included in the group. Thus, the first stage (barrier stage 1) of the barrier synchronization may be completed by executing data transfer once (the data transfer is executed twice in the example illustrated in FIG. 7).

Examples of Various Process Procedures of Processing System 100

Next, examples of various process procedures of the processing system 100 are described. First, a procedure for a job execution request process by the login server 103 is described.

Figure 9:
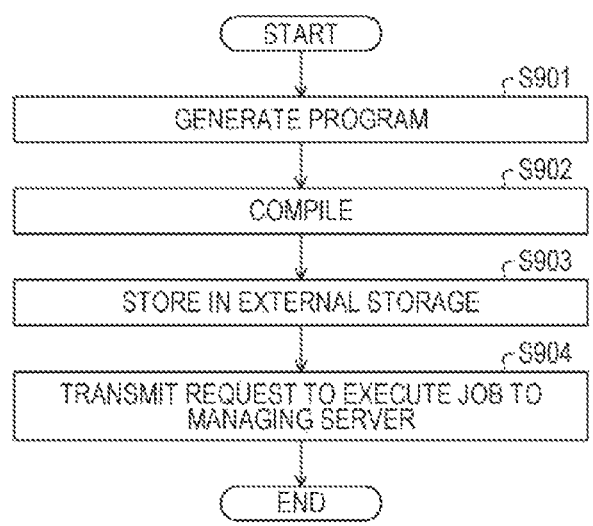
FIG. 9 is a flowchart illustrating an example of a procedure for a job execution request process by a login server.

FIG. 9 is a flowchart illustrating an example of the procedure for the job execution request process by the login server 103. In the flowchart illustrated in FIG. 9, first, the login server 103 generates the program of the job in response to an input operation by a user (in step S901). Then, the login server 103 compiles the generated program (in step S902).

After that, the login server 103 causes the compiled program to be stored in the external storage 120 of the storage server 102 (in step S903). Then, the login server 103 transmits a request to execute the job to the managing server 101 (in step S904) and terminates the job execution request process of the flowchart. Thus, the execution of the job is requested to the managing server 101.

Next, a procedure for a loading process by the storage server 102.

Figure 10:
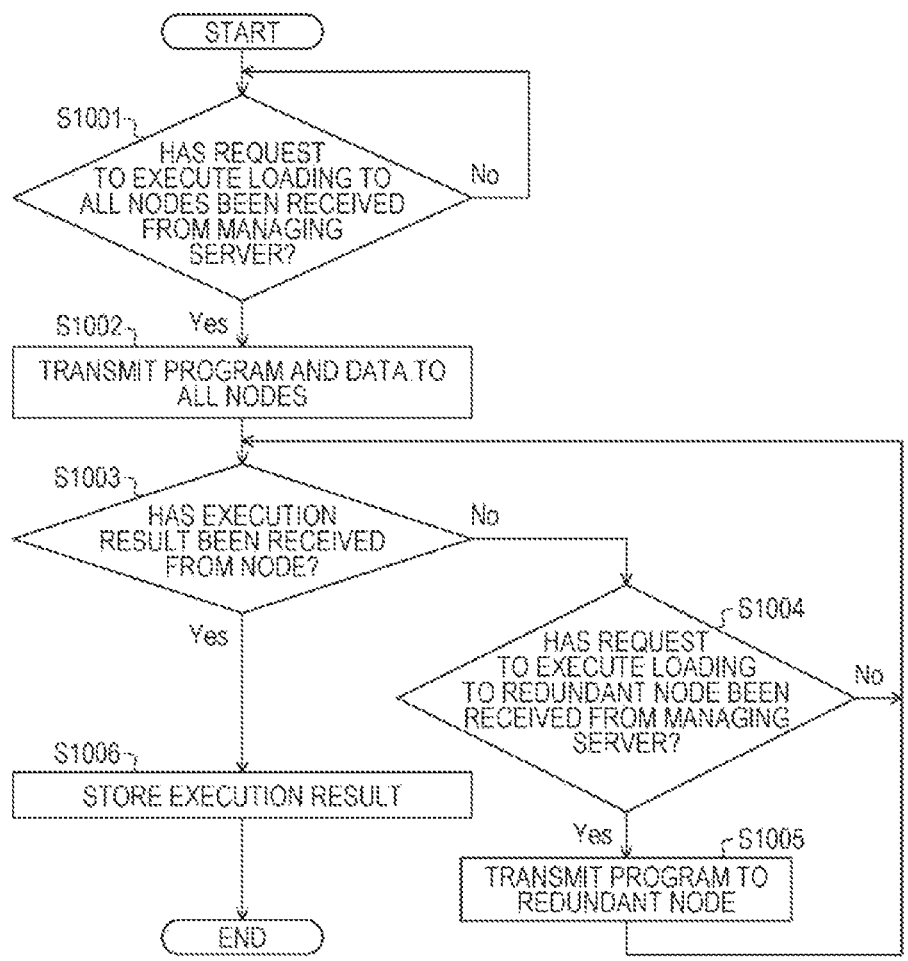
FIG. 10 is a flowchart illustrating an example of a procedure for a loading process by a storage server.

FIG. 10 is a flowchart illustrating an example of the procedure for the loading process by the storage server 102. In the flowchart illustrated in FIG. 10, first, the storage server 102 determines whether the storage server 102 has received a request to execute loading to all the nodes N0 to Nn from the managing server 101 (in step S1001).

The storage server 102 waits to receive the load request (No in step S1001). When the storage server 102 has received the load request (Yes in step S1001), the storage server 102 transmits, to all the nodes N0 to Nn, the program and the data that are already stored in the external storage 120 and are used to execute the job (in step S1002).

After that, the storage server 102 determines whether the storage server 102 has received a result of executing the job from a node Ni (in step S1003). When the storage server 102 has not received the result of executing the job (No in step S1003), the storage server 102 determines whether the storage server 102 has received a request to execute loading to the redundant node RN from the managing server 101 (in step S1004).

When the storage server 102 has not received the request to execute the loading to the redundant node RN (No in step S1004), the storage server 102 causes the loading process to return to step S1003. When the storage server 102 has received the request to execute the loading to the redundant node RN (Yes in step S1004), the storage server 102 transmits, to the redundant node RN, the program that is already stored in the external storage 120 and is used to execute the job (in step S1005). After that, the storage server 102 causes the loading process to return to step S1003.

When the storage server 102 has received the result of executing the job from the node Ni (Yes in step S1003), the storage server 102 stores the received result of executing the job in the external storage 120 (in step S1006). Then, the storage server 102 terminates the loading process.

Thus, the storage server 102 may transmit, in response to a request from the managing server 101, the program and the data to the nodes N0 to Nn for executing the job in parallel and transmit the program to the redundant node RN for taking over a process of a node in which a hardware failure or the like has occurred.

Next, a procedure for an execution control process by the managing server 101 is described.

Figure 11:
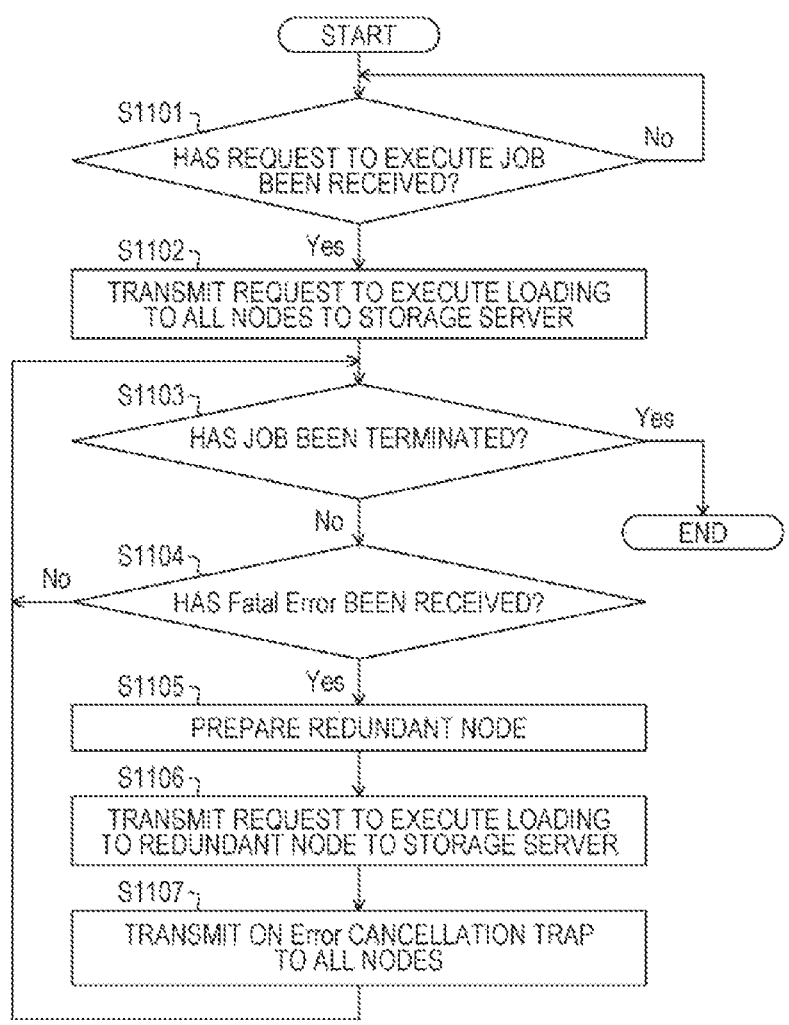
FIG. 11 is a flowchart illustrating an example of a procedure for an execution control process by a managing server.

FIG. 11 is a flowchart illustrating an example of the procedure for the execution control process by the managing server 101. In the flowchart illustrated in FIG. 11, first, the managing server 101 determines whether the managing server 101 has received a request to execute the job from the login server 103 (in step S1101). The managing server 101 waits to receive the request to execute the job (No in step S1101).

When the managing server 101 has received the request to execute the job (Yes in step S1101), the managing server 101 transmits a request to execute loading to all the nodes N0 to Nn to the storage server 102 (in step S1102). After that, the managing server 101 determines whether the execution of the job has been terminated (in step S1103).

When the execution of the job has not been terminated (No in step S1103), the managing server 101 determines whether the managing server 101 has received a fatal error from any node Ni among the nodes N0 to Nn (in step S1104). The fatal error is a signal indicating that a hardware failure or the like has occurred.

When the managing server 101 has not received the fatal error (No in step S1104), the managing server 101 causes the execution control process to return to step S1103. When the managing server 101 has received the fatal error (Yes in step S1104), the managing server 101 prepares the redundant node RN (in step S1105).

After that, the managing server 101 transmits a request to execute loading to the prepared redundant node RN to the storage server 102 (in step S1106). Then, the managing server 101 transmits the ON ERROR cancellation trap to all nodes (in step S1107) and causes the execution control process to return to step S1103.

The ON ERROR cancellation trap notifies all the nodes that the redundant node RN is newly used. In this case, all the nodes are among the nodes N0 to Nn and include the prepared redundant node RN and exclude the node Ni that has transmitted the fatal error.

When the execution of the job has been terminated (Yes in step S1103), the managing server 101 terminates the execution control process of the flowchart. By executing this, the execution of the job is controlled. For example, a failed node in which a hardware failure or the like has occurred during the execution of the job is removed, and the redundant node RN takes over a process of the failed node.

Next, a procedure for a parallel computation execution process by a node Ni is described. The following case is described below as an example. In the case, the number of nodes included in a group that is to be synchronized first when the barrier synchronization is executed during the execution of the job is "2".

Figure 12:
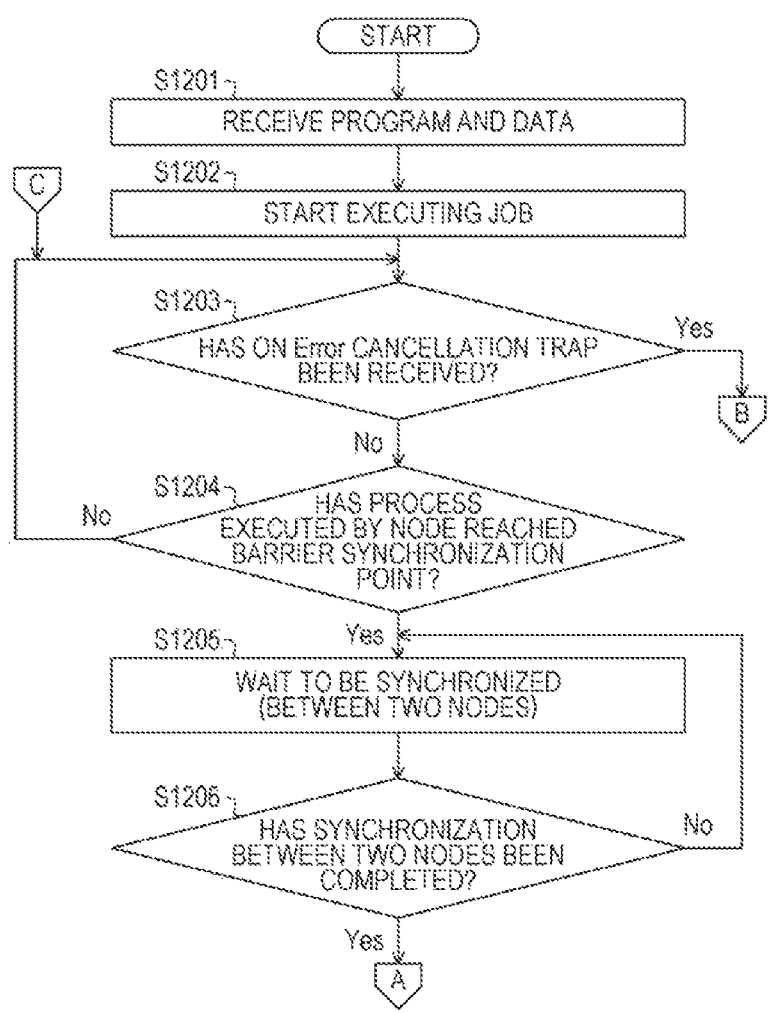
FIG. 12 is a first flowchart illustrating a procedure for a parallel computation execution process by a node.
Figure 13:
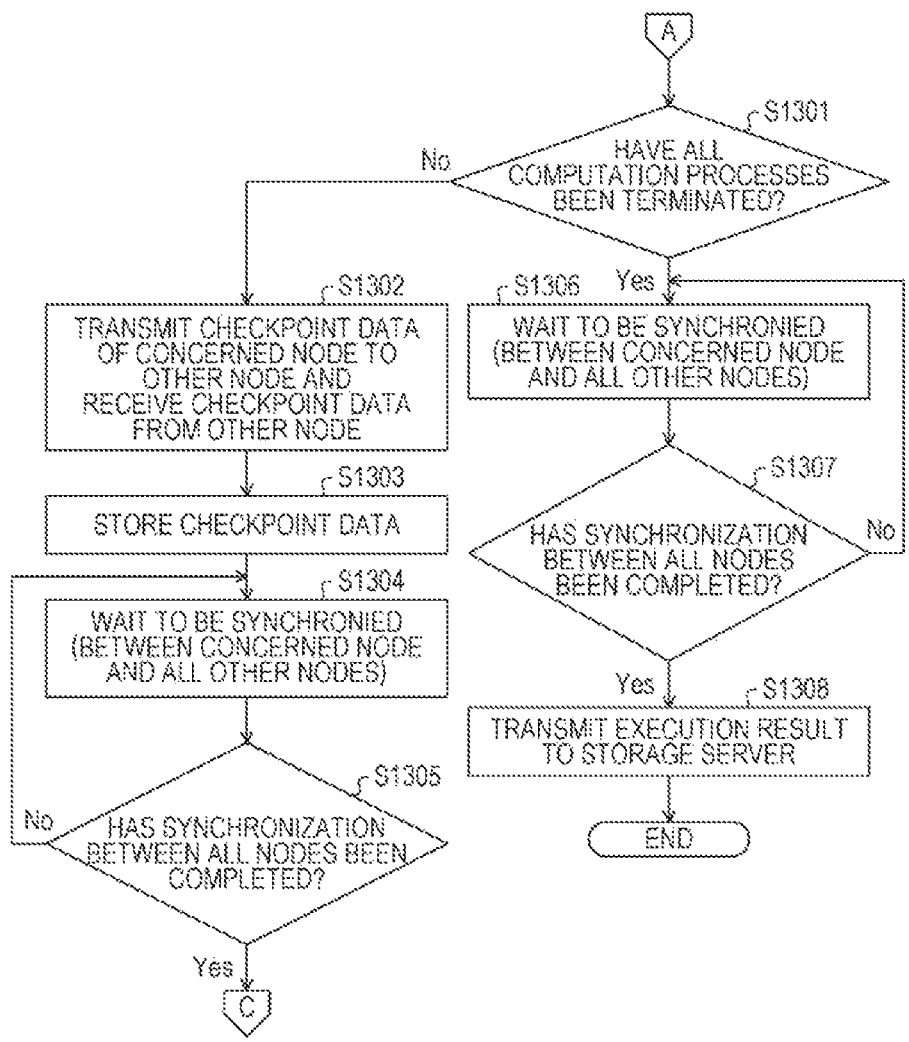
FIG. 13 is a second flowchart illustrating the procedure for the parallel computation execution process by the node.
Figure 14:
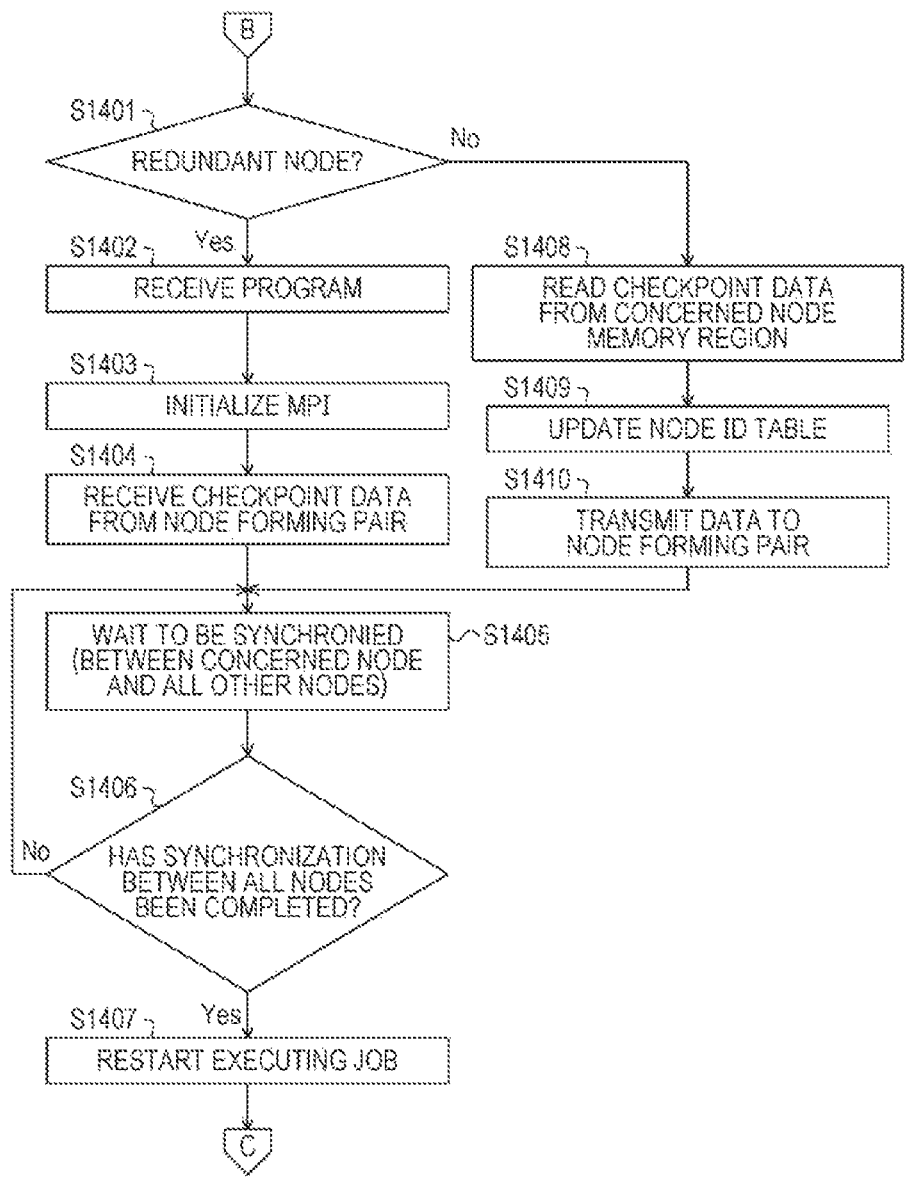
FIG. 14 is a third flowchart illustrating the procedure for the parallel computation execution process by the node.

FIGS. 12 to 14 are flowcharts illustrating the procedure for the parallel computation execution process by the node Ni. In the flowchart illustrated in FIG. 12, first, the node Ni receives, from the storage server 102, the program and the data that are used to execute the job (in step S1201). Then, the node Ni uses the received program and the received data to start executing the job (in step S1202).

Next, the node Ni determines whether the node Ni has received the ON ERROR cancellation trap from the managing server 101 (in step S1203). When the node Ni has not received the ON ERROR cancellation trap (No in step S1203), the node Ni determines whether a process, executed by the node Ni, of the job has reached the barrier synchronization point (in step S1204).

When the process, executed by the node Ni, of the job has not reached the barrier synchronization point (No in step S1204), the node Ni causes the parallel computation execution process to return to step S1203. When the process, executed by the node Ni, of the job has reached the barrier synchronization point (Yes in step S1204), the node Ni waits to be synchronized with another node to be synchronized with the node Ni first (in step S1205).

Then, the node Ni determines whether the synchronization between the node Ni and the other node to be synchronized with the node Ni first has been completed (in step S1206). When the synchronization between the two nodes has not been completed (No in step S1206), the node Ni causes the parallel computation execution process to return to step S1205. When the synchronization between the two nodes has been completed (Yes in step S1206), the node Ni causes the parallel computation execution process to proceed to step S1301 illustrated in FIG. 13.

In the flowchart illustrated in FIG. 13, the node Ni determines whether all computation processes of the job have been terminated (in step S1301). When one or more of all the computation processes of the job have not been terminated (No in step S1301), the node Ni transmits checkpoint data of the concerned node Ni to the other node completely synchronized with the concerned node Ni and receives checkpoint data from the other node (in step S1302). The checkpoint data of the concerned node Ni is read from the main memory 302 of the node Ni.

Then, the node Ni stores the transmitted checkpoint data of the concerned node Ni in the concerned node memory region 311 of the node Ni and stores the received checkpoint data of the other node in the other node memory region 312 of the node Ni (in step S1303). Then, the node Ni waits to be synchronized with all the other nodes (in step S1304).

Then, the node Ni determines whether the synchronization between the node Ni and all the other nodes has been completed (in step S1305). When the synchronization between the node Ni and all the other nodes has not been completed (No in step S1305), the node Ni causes the parallel computation execution process to return to step S1304. When the synchronization between the node Ni and all the other nodes has been completed (Yes in step S1305), the node Ni causes the parallel computation execution process to return to step S1203 illustrated in FIG. 12.

When the synchronization between the node Ni and another node forming a pair with the node Ni is established, the barrier synchronization transitions to the phase in which checkpoint data of the two nodes is to be mutually held between the two nodes. After the checkpoint data is completely mutually held between the two nodes, the node Ni waits for the completion of the barrier synchronization of the node Ni with all the other nodes. After the synchronization of the node Ni with all the other nodes is completed, the node Ni may execute a next computation process.

When all the computation processes are terminated (Yes in step S1301), the node Ni waits to be synchronized with all the other nodes (in step S1306). Then, the node Ni determines whether the synchronization between the node Ni and all the other nodes has been completed (in step S1307).

When the synchronization between the node Ni and all the other nodes has not been completed (No in step S1307), the node Ni causes the parallel computation execution process to return to step S1306 and waits for the completion of the synchronization between the node Ni and all the other nodes. When the synchronization between the node Ni and all the other nodes has been completed (Yes in step S1307), the node Ni transmits a result of executing the job to the storage server 102 (in step S1308). After that, the node Ni terminates the parallel computation execution process.

When the node Ni has received the ON ERROR cancellation trap (Yes in step S1203 illustrated in FIG. 12), the node Ni causes the parallel computation execution process to proceed to step S1401 illustrated in FIG. 14. When a failure, such as a hardware failure, occurs in the concerned node Ni, the node Ni transmits the fatal error to the managing server 101. However, when the node Ni is not able to communicate due to a failure, another node forming a pair with the node Ni detects an abnormality of the node Ni using a method, such as existence monitoring, and transmits the fatal error to the managing server 101.

In the flowchart illustrated in FIG. 14, first, the node Ni determines whether the concerned node Ni is the redundant node RN to be set on behalf of a failed node (in step S1401). When the node Ni is the redundant node RN (Yes in step S1401), the node Ni receives, from the storage server 102, the program to be used to execute the job (in step S1402).

Then, the node Ni initializes a message passing interface (MPI) to form a node group (nodes N0 to Nn) in which the failed node is replaced with the concerned node Ni and that execute the job (in step S1403). After that, the node Ni receives checkpoint data from the node that forms the pair with the node Ni and is to be synchronized with the node Ni first when the barrier synchronization is executed (in step S1404). The received checkpoint data is stored in the concerned node memory region 311 of the node Ni.

Then, the node Ni waits to be synchronized with all the other nodes (in step S1405). Then, the node Ni determines whether the synchronization between the node Ni and all the other nodes has been completed (in step S1406). The node Ni waits for the completion of the synchronization between the node Ni and all the other nodes (No in step S1406).

When the synchronization between the node Ni and all the other nodes has been completed (Yes in step S1406), the node Ni uses the checkpoint data stored in the concerned node memory region 311 of the node Ni to restart executing the job (in step S1407). Then, the node Ni causes the parallel computation execution process to return to step S1203 illustrated in FIG. 12.

When the node Ni is not the redundant node RN (No in step S1401), the node Ni reads the checkpoint data from the concerned node memory region 311 of the small storage region 310 of the node Ni (in step S1408). After that, the node Ni updates the node ID table based on information of the redundant node RN (in step S1409).

After that, the node Ni transmits the read checkpoint data to the other node that is to be synchronized with the node Ni first when the barrier synchronization is executed (in step S1410). Then, the node Ni causes the parallel computation execution process to proceed to step S1405. When the node Ni does not form a pair with a failed node and is not the redundant node RN (No in step S1401), the node Ni may cause the parallel computation execution process to proceed to step S1405.

By executing this, checkpoint data may be mutually backed up between nodes to be synchronized with each other in the first stage of the barrier synchronization for every execution of the barrier synchronization during the execution of the job. When a node forming a pair with the node Ni fails, the node Ni may transmit the checkpoint data to the redundant node RN set in the group on behalf of the failed node and restart executing the job from an intermediate state of the job.

When the node Ni waits to be synchronized in steps S1205, S1206, S1304, S1305, S1306, and S1307 and receives the ON ERROR cancellation trap, the node Ni causes the parallel computation execution process to return to step S1203 and continuously executes the parallel computation execution process, although not illustrated in FIGS. 12 and 13. This is executed to inhibit the node Ni from being hung up in a state in which the node Ni waits to be synchronized.

Example of Processing System 100

Next, an example of the processing system 100 is described using a specific example of a target problem to be computed by many nodes.

FIG. 15 is an explanatory diagram describing the specific example of the target problem. An example in which a matrix vector illustrated in FIG. 15 is computed by nodes N0 to Np is described below. The following items (1) to (5), however, are assumed.

(1) The nodes N0 to Np compute "y=A*x".

(2) The nodes N0 to Np have a number "A=M×N" of elements.

(3) The multiple nodes N0 to Np process each row (including a number M of elements) of the matrix vector, cause one node to collect all results, and cause the results to be stored in the storage server 102.

(4) The nodes N0 to Np execute the barrier synchronization for each row of the matrix vector. For example, even when a hardware failure occurs, the barrier synchronization is executed again for only one row.

(5) Data of A and x is loaded in all the nodes N0 to Np in advance.

For example, the node N0 executes computation on a[0:n][0] to a[0:n][2], the node N1 executes computation on a[0:n][3] to a[0:n][5], and the node Np executes computation on a[0:n][m−2] to a[0:n][m].

An example of the program to be loaded into each of the nodes N0 to Np is described below.

FIGS. 16A, 16B, 16C, 16D, 16E, 16F, 16G, 16H, and 16I are explanatory diagrams illustrating the example of the program. FIGS. 16A to 16I illustrate a program 1600 obtained by simplifying the program to be loaded into each of the nodes N0 to Np. FIGS. 16A to 16I illustrate a portion of the program 1600. The following items <1> to <8> are assumed.

<1> Physical node information of the redundant node RN and a virtual node number of a failed node are transmitted in response to the ON ERROR cancellation trap from the managing server 101.

<2> When a hardware failure occurs, the program loaded in the redundant node RN based on a request from the managing server 101 includes information of the redundant node RN. For example, when MPI communication is used, and a process of initializing an MPI is executed in the redundant node RN, a node group including the redundant node RN with which the failed node has been replaced is formed.

<3> copyarea is of the int type and is secured as a region.

<4> A function (On_error) of an error handler exists and is a function of enabling interruption and executing processing even during the time when a node waits for the barrier synchronization.

<5> A function (PairBarrier) of recognizing a termination status between two nodes forming a pair exists.

<6> A function (MutualCp) of executing mutual holding between two nodes forming a pair exists.

<7> A function (IntermediateCP) of copying a concerned node memory region exists.

<8> A function (PhysicalNode) of acquiring physical node information of a concerned node exists.

FIGS. 17A and 17B are explanatory diagrams illustrating an example of memory maps. FIGS. 17A and 17B illustrate memory maps of nodes Ni and N(i+1). In the example illustrated in FIGS. 17A and 17B, a small storage region exists in a range from 0x80000000 in each of the memory maps.

It is assumed that a system region (OS region) and a program region exist in a range from 0x00000000 to 0x3FFFFFFF in each of the memory maps and that an area to be used for computation exists in a range from 0x40000000 to 0x7FFFFFFF for the number CA of elements in each of the memory maps. The area has a (2) table region, a (3) data region y, a (4) data region A, and a (5) data region x in each of the memory maps. A computation result is stored in the (3) data region y.

The small storage region has a data backup region in a range from 0x80000000 to 0xBFFFFFFF for the concerned node and a backup region in a range from 0xC0000000 to 0xFFFFFFFF for the node forming the pair with the concerned node. The number of elements of each of the backup regions is CA.

The (2) table region has a table region for a barrier point number and virtual-to-actual node conversion. The barrier point number indicates a row on which matrix computation has been executed last. Since the (2) table region has a table for the virtual-to-actual node conversion, the redundant node RN is used without a change in the program, and the (2) table region does not affect the re-execution of the program.

A portion 1601 illustrated in FIGS. 16E and 16F is a main routine of the matrix computation. Matrix elements of each row are divided into elements including elements of ist and ien and are computed. The computation of rows to be processed is progressed using line. Final results are obtained using an MPI_Allreduce function. When a hardware failure does not occur, a while loop is repeatedly executed to execute the computation until the number of elements of y is equal to N.

Figure 16I:
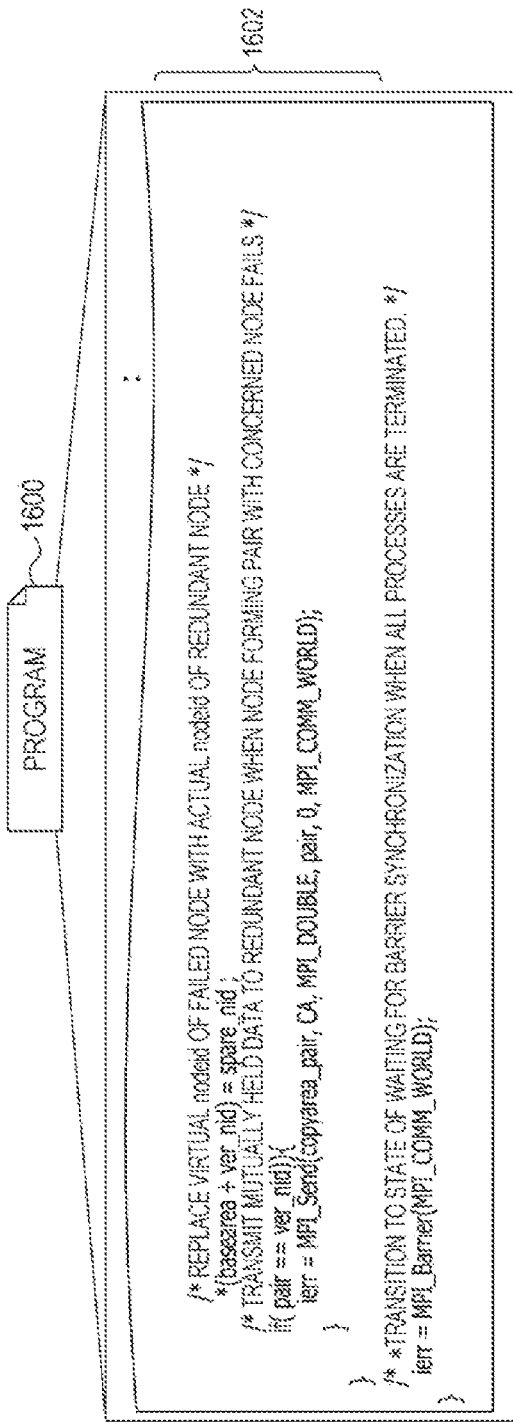
FIG. 16I is a ninth explanatory diagram illustrating the example of the program.

A portion 1602 illustrated in FIGS. 16G, 16H, and 16I is a routine of an On_error process. When a hardware failure occurs in a certain node, the certain node or another node forming a pair with the certain node detects an abnormality using a method, such as existence monitoring, and notifies the managing server 101 that the hardware failure has occurred. When the managing server 101 detects the hardware failure, the managing server 101 prepares the redundant node RN and issues the ON ERROR cancellation trap to a node group (combination indicated by MPI_COMM_WORLD in the program) of nodes that operate in parallel.

Most of the nodes that have received the ON ERROR cancellation trap wait for the barrier synchronization and are in a loop state, but execute the On_error function in an interrupt process. The On_error function causes the redundant node RN and each of nodes (normal nodes), in which a hardware failure does not occur, to operate in different manners.

The program is loaded into the redundant node RN from the storage server 102, and the redundant node RN executes the initialization process to use an MPI function, receives data of copyarea_pair from a node forming a pair with the redundant node RN. It is assumed that the program that includes the information of the redundant node RN is loaded into the redundant node RN from the managing server 101, the MPI is initialized in a state in which a failed node is replaced with the redundant node RN at the time of the execution of MPI_init, and copyarea_pair is received via the MPI communication (the assumption <2>). After that, the redundant node RN enters the same routine of waiting for the barrier synchronization as the other node, and transitions to a state of waiting for the barrier synchronization.

Each of the normal nodes copies an area of copyarea_my of the concerned node to basearea, and replaces, based on trap information (ON ERROR cancellation trap), a physical node number of a virtual node in which a hardware failure has occurred with a physical node number of the redundant node RN. When a hardware failure occurs in a node forming a pair with a normal node, the normal node transmits copyarea_pair stored in small storage to the redundant node RN and transitions to a state of waiting for the barrier synchronization after the transmission of copyarea_pair.

The nodes transition out of barrier synchronization states in order from a node that recognizes that all the nodes have entered a state of waiting for the barrier synchronization, and the nodes execute the program again from the top of a while statement. Since line indicating a row to be processed is not updated at the time of the execution of MPI_Barrier within the while statement, a value included in basearea is used for line without a change in the value.

As described above, a node Ni according to the embodiment transmits checkpoint data of the concerned node Ni to another node, which is among the nodes N0 to Nn and to be synchronized with the concerned node Ni first, and receives checkpoint node of the other node from the other node when the barrier synchronization is executed between the nodes N0 to Nn for executing the same job. Then, the node Ni stores the transmitted checkpoint data of the concerned node Ni in the concerned node memory region 311 within the disk 303 of the concerned node Ni and stores the received checkpoint data of the other node in the other node memory region 312 within the disk 303. The checkpoint data of the node Ni is information stored in the main memory 302 of the node Ni. The checkpoint data of the other node is information stored in the main memory 302 of the other node.

At the time of the execution of the barrier synchronization between the nodes N0 to Nn executing the same job, data (checkpoint data) within the main memories 302 of nodes to be synchronized with each other in the first stage (barrier stage 1) of the barrier synchronization may be backed up between the nodes.

In addition, when the barrier synchronization is executed, a node Ni transmits checkpoint data of the concerned node Ni to one or more other nodes, which are among the nodes N0 to Nn and are included in a group to be synchronized with the concerned node Ni first, and receives checkpoint data of the one or more other nodes included in the group.

Thus, even when the number of nodes included in the group to be synchronized first in the first stage of the barrier synchronization is "3", checkpoint data of the nodes may be mutually held between the nodes included in the group. Since each pair of nodes is formed so that checkpoint data of each of nodes Ni included in a group is held in another node included in the group, it may be possible to inhibit an increase in a memory capacity to be used to back up checkpoint data of each of the nodes Ni.

In addition, when the barrier synchronization is executed, a node Ni transmits checkpoint data of the concerned node Ni to each of other nodes, which are among the nodes N0 to Nn and are included in a group to be synchronized with the concerned node Ni first, and receives checkpoint data of the other nodes included in the group. Then, the node Ni stores the transmitted checkpoint data of the concerned node Ni in the concerned node memory region 311 within the disk 303 of the concerned node Ni and stores the received checkpoint data of the other nodes in the other node memory regions 312 (for example, the other node memory regions 312-1 and 312-2 illustrated in FIG. 8) within the disk 303.

Thus, the node Ni holds the checkpoint data of the other nodes (nodes N1 and N2) included in the group to be synchronized in the first stage of the barrier synchronization. Thus, even when hardware failures simultaneously occur in multiple nodes included in a group, the job may be executed again from an intermediate state of the job based on the information stored in the small storage region 310 of a normal node included in the group.

In addition, a node Ni may transmit checkpoint data of the concerned node Ni to another node at the time of the synchronization of the node Ni with the other node or when a process, executed by the node Ni, of the job reaches the barrier synchronization point. Then, the node Ni may determine that the synchronization with the other node has been completed in response to the transmission of checkpoint data of the concerned node Ni to the other node and the reception of checkpoint data of the other node from the other node.

Thus, the completion of the first stage of the barrier synchronization may be determined when the checkpoint data is mutually held between the nodes. Thus, the nodes may not notify the states of the nodes to each other when the synchronization is executed between the nodes, and it may be possible to reduce communication to be executed to confirm the synchronization between the nodes.

In addition, a node Ni may transmit checkpoint data of the concerned node Ni to another node and receive checkpoint data of the other node from the other node for every execution of the barrier synchronization after the predetermined time period T elapses after the start of the execution of the job.

Since an advantage of backup within a certain time period after the start of the execution of the job is small, the mutual holding of checkpoint data between the nodes may be delayed.

In addition, when a failure occurs in the other node, the node Ni may transmit the checkpoint data, stored in the other node memory region 312 within the disk 303 of the node Ni, of the other node to the redundant node RN for taking over a process of the other node. Then, the node Ni may restart executing the job based on the checkpoint data, stored in the concerned node memory region 311 within the disk 303 of the concerned node Ni, of the concerned node Ni.

Thus, even when a failure occurs in the other node to be synchronized with the concerned node in the first stage of the barrier synchronization, a process (routine during which an error has occurred) may be executed again using checkpoint data at the time of successful execution of the barrier synchronization between all the nodes, and the job may be restarted. Thus, even when a node is not available due to a hardware failure or the like, a process may be returned to a state when or before a periodical saving process has been previously executed. For example, it is assumed that a job that executes an entire process for a time period of 24 hours is divided into sub-jobs, each of which executes a process for a time period of 1 hour. A penalty when the backup method according to the embodiment is not used is a time period for which the job is executed before the occurrence of a hardware failure. The penalty when the backup method according to the embodiment is not used is a time period of up to 24 hours. On the other hand, a penalty when the backup method according to the embodiment is used is a time period of "(up to) 1 hour+23×the length of time it takes to mutually hold checkpoint data+α (the length of time it takes to prepare the redundant node RN by the managing server 101 or the like)".

For example, it is assumed that it takes 24 hours to complete the entire process, a saving process is executed at time intervals of 1 hour (or the barrier synchronization is executed at time intervals of 1 hour), and it takes 10 minutes to completely execute each saving process. In this case, the length of time it takes to complete the job is "27.8 hours=24×60+23×10=1670 minutes".

In addition, it is assumed that a hardware failure occurs after 10 hours elapse after the start of the execution of the job once in three times. In this case, in the processing system 100, the length of time it takes to execute 6 programs (jobs) is "169.0 hours (=1670×6+60×(6/3)=10,140 minutes)".

In an existing processing system, the length of time it takes to execute the 6 programs (jobs) is "187.0 hours (=1670×6+600×(6/3)=11,220 minutes)" (the length of time, however, is calculated using the penalty as 10 hours). In this case, the length of time to execute the 6 programs (jobs) in the processing system 100 is shorter than that in the existing processing system and has an advantage.

In addition, the length of time it takes to mutually hold checkpoint data in the embodiment is compared with that in a related method for a system including one storage device under the following assumptions (1) to (5).

(1) The amount of data mutually held per node is 8 MB.
(2) The number of nodes is 100.
(3) A communication bandwidth is larger than an IO bandwidth, and transmission and reception may be simultaneously processed.
(4) An IO bandwidth of the storage device used in the related method is 1 GB/sec by using a striping technique.
(5) The IO interface according to the embodiment is implemented in each of the nodes and is configured using a disk of 100 MB/sec, and an IO bandwidth according to the embodiment is 100 MB/sec.

In the related method, data of 8 MB for each of 100 nodes is stored in the storage device with a bandwidth of 1 GB/sec, and thus it takes 0.8 seconds (=8 MB×100/1 GB/sec). In the embodiment, data is mutually held between nodes forming a pair, and thus a data amount is 8 MB even when the 100 nodes are used. It takes 0.08 seconds (=8 MB×1/100 MB/sec) and the length of time it takes to execute the backup is 1/10 of that in the related method. In the embodiment, the storage of the system may not have a wide bandwidth, and thus the cost of the storage may be reduced.

Based on the above description, the processing system 100 according to the embodiment and the nodes Ni may inhibit access from being concentrated to the storage in the periodical backup during the execution of the job, reduce a load of the entire system, and reduce the length of time it takes to execute the backup.

The backup method described in the embodiment may be enabled by causing a computer, such as a personal computer or a workstation, to execute a program prepared in advance. The parallel computation execution program is recorded in a computer-readable recording medium, read by the computer from the recording medium, and executed by the computer. The computer-readable recording medium is a hard disk, a flexible disk, a compact disc-read only memory (CD-ROM), a magneto-optical (MO) disk, a digital versatile disc (DVD), a Universal Serial Bus (USB) memory, or the like. In addition, the parallel computation execution program may be distributed via a network, such as the Internet.

In addition, the parallel processing device (node Ni) described in the embodiment may be realized by an application specific IC, such as a standard cell or a structured application specific integrated circuit (ASIC), or a programmable logic device (PLD), such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A node comprising:
   a first memory;
   a second memory including a first memory region and a second memory region; and
   a processor coupled to the first memory and configured to:
      when barrier synchronization is executed in multiple barrier stages between multiple nodes that include the node and execute processing for a same job, transmit first data indicating an intermediate result of the processing of the node to another node with which processing of the node is to be synchronized at a first barrier stage of the multiple barrier stages among the multiple nodes, and receive second data indicating an intermediate result of processing of the another node from the another node; and
      store the first data of the node in the first memory region of the second memory, and store the second data of the another node in the second memory region of the second memory.

2. The node of claim 1, wherein
   the processor is configured to
      when the barrier synchronization is executed between the multiple nodes, transmit the first data of the node to a first node included in a group of nodes which are among the multiple nodes and whose processing is to be synchronized with the node first, and receive third data indicating an intermediate result of processing of a second node included in the group of nodes from the second node.

3. The node of claim 2, wherein
   the processor is configured to:
      when the barrier synchronization is executed between the multiple nodes, transmit the first data of the node to other nodes in the group of nodes, and receive pieces of fourth data each indicating an intermediate result of processing of each of the other nodes from the other nodes, respectively; and
      store the first data of the node in the first memory region, and store the received pieces of the fourth data in memory areas of the second memory region that respectively correspond to the other nodes.

4. The node of claim 1, wherein
   the processor is configured to:
      transmit the first data of the node to the another node at a time of synchronizing processing of the node with the another node; and
      in response to reception of the second data of the another node from the another node after transmitting the first data of the node to the another node, determine that synchronization of the node with the another node is completed.

5. The node of claim 1, wherein
   the processor is configured to
      each time the barrier synchronization is executed between the multiple nodes after a predetermined time period elapses from start of execution of the job, transmit the first data of the node to the another node and receive the second data of the another node from the another node.

6. The node of claim 1, wherein
   the processor is configured to:
      when a failure occurs in the another node, transmit the second data of the another node stored in the second memory region, to a redundant node taking over processing of the another node, and
      restart executing the job based on the first data of the node stored in the first memory region.

7. The node of claim 1, wherein:
   the first data of the node is checkpoint data of the first node stored in the first memory of the node; and
   the second data of the another node is checkpoint data of the second node stored in a first memory provided for the another node.

8. A non-transitory, computer-readable recording medium having stored therein a program for causing a computer included in a node to execute a process comprising:
   when barrier synchronization is executed in multiple barrier stages between multiple nodes that include the node and execute processing for a same job, transmit first data indicating an intermediate result of the processing of the node to another node with which processing of the node is to be synchronized at a first barrier stage of the multiple barrier stages among the multiple nodes, and receive second data indicating an intermediate result of processing of the another node from the another node; and
   storing the first data of the node in a first memory region of a memory, and store the second data of the another node in a second memory region of the memory.

9. The non-transitory, computer-readable recording medium of claim 8, wherein
   the process further comprises
      when the barrier synchronization is executed between the multiple nodes, transmitting the first data of the node to a first node included in a group of nodes which are among the multiple nodes and whose processing is to be synchronized with the node first, and receiving third data indicating an intermediate result of processing of a second node included in the group of nodes from the second node.

10. The non-transitory, computer-readable recording medium of claim 9, wherein the process further comprises:
when the barrier synchronization is executed between the multiple nodes, transmitting the first data of the node to other nodes in the group of nodes, and receiving pieces of fourth data each indicating an intermediate result of processing of each of the other nodes from the other nodes, respectively; and
storing the first data of the node in the first memory region, and store the received pieces of the fourth data in memory areas of the second memory region that respectively correspond to the other nodes.

11. The non-transitory, computer-readable recording medium of claim 9, wherein
the process further comprises:
transmitting the first data of the node to the another node at a time of synchronizing processing of the node with the another node; and
in response to reception of the second data of the another node from the another node after transmitting the first data of the node to the another node, determining that synchronization of the node with the another node is completed.

12. The non-transitory, computer-readable recording medium of claim 8, wherein
the process further comprises:
each time the barrier synchronization is executed between the multiple nodes after a predetermined time period elapses from start of execution of the job, transmitting the first data of the node to the another node and receive the second data of the another node from the another node.

13. The non-transitory, computer-readable recording medium of claim 8, wherein
the process further comprises:
when a failure occurs in the another node, transmitting the second data of the another node stored in the second memory region, to a redundant node taking over processing of the another node, and
restarting executing the job based on the first data of the node stored in the first memory region.

14. The non-transitory, computer-readable recording medium of claim 8, wherein:
the first data of the node is data stored in the first memory of the node; and
the second data of the another node is data stored in a first memory provided for the another node.

15. A method performed by a processor included in a node, the method comprising:
when barrier synchronization is executed in multiple barrier stages between multiple nodes that include the node and execute processing for a same job, transmit first data indicating an intermediate result of the processing of the node to another node with which processing of the node is to be synchronized at a first barrier stage of the multiple barrier stages among the multiple nodes, and receive second data indicating an intermediate result of processing of the another node from the another node; and
storing the first data of the node in a first memory region of a memory, and store the second data of the another node in a second memory region of the memory.

* * * * *